United States Patent
Meir et al.

(10) Patent No.: US 7,907,804 B2
(45) Date of Patent: Mar. 15, 2011

(54) ELIMINATION OF STITCH ARTIFACTS IN A PLANAR ILLUMINATION AREA

(75) Inventors: Noam Meir, Hezlia (IL); Micha Zimmermann, Haifa (IL); Yosi Shani, Maccabim (IL)

(73) Assignee: Oree, Inc., Ramat Gan (IL)

( * ) Notice: Subject to any disclaimer, the term of this patent is extended or adjusted under 35 U.S.C. 154(b) by 0 days.

(21) Appl. No.: 12/324,555

(22) Filed: Nov. 26, 2008

(65) Prior Publication Data
US 2009/0162015 A1 Jun. 25, 2009

Related U.S. Application Data

(60) Provisional application No. 61/059,932, filed on Jun. 9, 2008.

(51) Int. Cl.
*G02B 6/26* (2006.01)
*G02F 1/13357* (2006.01)
*F21V 8/00* (2006.01)
*F21V 7/04* (2006.01)

(52) U.S. Cl. .............. 385/31; 349/65; 362/616; 362/628

(58) Field of Classification Search .................. 385/31; 349/63, 65; 362/616, 628
See application file for complete search history.

(56) References Cited

U.S. PATENT DOCUMENTS

| | | |
|---|---|---|
| 3,261,356 A | 7/1966 | Wallace |
| 3,626,471 A | 12/1971 | Florin |
| 3,995,934 A | 12/1976 | Nath et al. |
| 4,551,129 A | 11/1985 | Coleman et al. |
| 4,669,467 A | 6/1987 | Willett et al. |
| 4,762,381 A | 8/1988 | Uemiya et al. |
| 4,829,192 A | 5/1989 | Kokubu et al. |
| 4,853,593 A | 8/1989 | Stein et al. |
| 4,872,837 A | 10/1989 | Issalene et al. |
| 4,906,062 A | 3/1990 | Young et al. |
| 5,048,913 A | 9/1991 | Glenn et al. |
| 5,061,032 A | 10/1991 | Meltz et al. |
| 5,139,420 A | 8/1992 | Walker |
| 5,152,686 A | 10/1992 | Duggan et al. |
| 5,165,187 A | 11/1992 | Shahidi-Hamedani et al. |
| 5,281,134 A | 1/1994 | Schultz |
| 5,425,730 A | 6/1995 | Luloh |
| 5,535,105 A | 7/1996 | Koenen et al. |
| 5,559,358 A | 9/1996 | Burns et al. |
| 5,569,254 A | 10/1996 | Carlson et al. |

(Continued)

FOREIGN PATENT DOCUMENTS

DE  1 995 2430  5/2001

(Continued)

OTHER PUBLICATIONS

Beeson et al., "61.5: LED-Based Light-Recycling Light Sources for Projection Displays," *SID Symp. Dig. of Tech. Papers*, 37(1): 1823-1826 (2006).

(Continued)

*Primary Examiner* — Jerry T Rahll
(74) *Attorney, Agent, or Firm* — Bingham McCutchen LLP

(57) ABSTRACT

In one aspect, a planar illumination area includes two light-guide elements, each with an out-coupling region. At least a portion of each out-coupling region overlaps with at least a portion of the other. The overlapping region emits a substantially uniform light output power.

23 Claims, 21 Drawing Sheets

U.S. PATENT DOCUMENTS

| | | | |
|---|---|---|---|
| 5,580,154 A | 12/1996 | Coulter et al. | |
| 5,718,666 A | 2/1998 | Alarcon | |
| 5,813,752 A | 9/1998 | Singer et al. | |
| 5,813,753 A | 9/1998 | Vriens et al. | |
| 5,847,507 A | 12/1998 | Butterworth et al. | |
| 5,899,552 A | 5/1999 | Yokoyama et al. | |
| 5,959,316 A | 9/1999 | Lowery | |
| 5,969,869 A | 10/1999 | Hirai et al. | |
| 6,031,511 A | 2/2000 | DeLuca et al. | |
| 6,079,838 A | 6/2000 | Parker et al. | |
| 6,155,699 A | 12/2000 | Miller et al. | |
| 6,226,440 B1 | 5/2001 | Lyons | |
| 6,275,512 B1 | 8/2001 | Fermann | |
| 6,278,106 B1 | 8/2001 | Muto et al. | |
| 6,322,225 B1 | 11/2001 | Koike | |
| 6,329,444 B1 | 12/2001 | McGlothlin et al. | |
| 6,351,069 B1 | 2/2002 | Lowery et al. | |
| 6,356,691 B2 | 3/2002 | Seong-jin et al. | |
| 6,408,123 B1 | 6/2002 | Kuroda et al. | |
| 6,473,554 B1 | 10/2002 | Pelka et al. | |
| 6,488,704 B1 | 12/2002 | Connelly et al. | |
| 6,491,443 B1 | 12/2002 | Serizawa et al. | |
| 6,501,100 B1 | 12/2002 | Srivastava et al. | |
| 6,501,102 B2 | 12/2002 | Mueller-Mach et al. | |
| 6,522,065 B1 | 2/2003 | Srivastava et al. | |
| 6,530,670 B2 | 3/2003 | Hirayama et al. | |
| 6,549,709 B1 | 4/2003 | De Dobbelaere et al. | |
| 6,551,346 B2 | 4/2003 | Crossley | |
| 6,554,462 B2 | 4/2003 | Hulse et al. | |
| 6,608,332 B2 | 8/2003 | Shimizu et al. | |
| 6,614,179 B1 | 9/2003 | Shimizu et al. | |
| 6,621,211 B1 | 9/2003 | Srivastava et al. | |
| 6,635,363 B1 | 10/2003 | Duclos et al. | |
| 6,635,987 B1 | 10/2003 | Wojnarowski et al. | |
| 6,671,235 B1 | 12/2003 | Hawryluk et al. | |
| 6,680,004 B2 | 1/2004 | Ono et al. | |
| 6,687,010 B1 | 2/2004 | Horii et al. | |
| 6,694,069 B2 | 2/2004 | Kaneko et al. | |
| 6,765,237 B1 | 7/2004 | Doxsee et al. | |
| 6,850,665 B2 | 2/2005 | Grubsky et al. | |
| 6,853,131 B2 | 2/2005 | Srivastava et al. | |
| 6,871,982 B2 | 3/2005 | Holman et al. | |
| 6,890,234 B2 | 5/2005 | Bortscheller et al. | |
| 6,908,205 B2 | 6/2005 | Greiner et al. | |
| 6,917,057 B2 | 7/2005 | Stokes et al. | |
| 6,939,481 B2 | 9/2005 | Srivastava et al. | |
| 6,941,069 B2 | 9/2005 | Kaneko et al. | |
| 6,982,522 B2 | 1/2006 | Omoto et al. | |
| 7,005,086 B2 | 2/2006 | Matsuno et al. | |
| 7,006,306 B2 | 2/2006 | Falicoff et al. | |
| 7,015,510 B2 | 3/2006 | Srivastava et al. | |
| 7,026,756 B2 | 4/2006 | Shimizu et al. | |
| 7,045,826 B2 | 5/2006 | Kim et al. | |
| 7,071,616 B2 | 7/2006 | Shimizu et al. | |
| 7,123,796 B2 | 10/2006 | Steckl et al. | |
| 7,218,824 B2 | 5/2007 | Franklin et al. | |
| 7,251,389 B2 | 7/2007 | Lu et al. | |
| 7,293,906 B2* | 11/2007 | Mok et al. | 362/609 |
| 7,430,355 B2 | 9/2008 | Heikenfeld et al. | |
| 7,607,815 B2* | 10/2009 | Pang | 362/612 |
| 2001/0053072 A1 | 12/2001 | Takemoto | |
| 2004/0246697 A1 | 12/2004 | Yamashita et al. | |
| 2005/0100288 A1 | 5/2005 | Chu | |
| 2005/0116667 A1 | 6/2005 | Mueller et al. | |
| 2005/0243243 A1 | 11/2005 | Koganezawa | |
| 2005/0258432 A1 | 11/2005 | Cho | |
| 2006/0008205 A1 | 1/2006 | Meir et al. | |
| 2006/0092346 A1 | 5/2006 | Moon et al. | |
| 2006/0131924 A1 | 6/2006 | Reck | |
| 2006/0203502 A1 | 9/2006 | Stevens et al. | |
| 2006/0221610 A1 | 10/2006 | Chew et al. | |
| 2006/0262250 A1 | 11/2006 | Hobbs | |
| 2007/0057626 A1 | 3/2007 | Kurihara et al. | |
| 2007/0086211 A1 | 4/2007 | Beeson et al. | |
| 2007/0133210 A1 | 6/2007 | Watson et al. | |
| 2007/0133935 A1 | 6/2007 | Fine | |
| 2008/0061683 A1 | 3/2008 | Bertram | |
| 2008/0094348 A1 | 4/2008 | Yin et al. | |
| 2008/0122365 A1 | 5/2008 | Decius et al. | |
| 2008/0151576 A1 | 6/2008 | Inditsky | |
| 2008/0192458 A1 | 8/2008 | Li | |
| 2008/0212315 A1 | 9/2008 | Cornelissen et al. | |
| 2008/0239749 A1* | 10/2008 | Saccomanno et al. | 362/609 |
| 2008/0251690 A1 | 10/2008 | Keiper et al. | |
| 2008/0297644 A1 | 12/2008 | Farchtchian et al. | |
| 2008/0305439 A1 | 12/2008 | Khan | |
| 2008/0316605 A1 | 12/2008 | Hazell et al. | |
| 2009/0001397 A1 | 1/2009 | Fine et al. | |
| 2009/0027588 A1 | 1/2009 | Medendorp, Jr. et al. | |
| 2009/0046453 A1 | 2/2009 | Kramer | |
| 2009/0046978 A1 | 2/2009 | Yasuda et al. | |
| 2009/0052205 A1 | 2/2009 | Chen et al. | |
| 2009/0059553 A1 | 3/2009 | Lin | |
| 2009/0151575 A1 | 6/2009 | Eisendrath | |

FOREIGN PATENT DOCUMENTS

| | | |
|---|---|---|
| EP | 0911658 | 4/1999 |
| EP | 1 376 708 A | 1/2004 |
| GB | 2 343 361 | 5/2000 |
| GB | 2448564 | 10/2008 |
| JP | 5-127158 | 5/1993 |
| JP | 2004-241282 | 8/2004 |
| JP | 2005-085718 | 3/2005 |
| WO | WO-1996-023649 | 8/1996 |
| WO | WO-1997-031219 | 8/1997 |
| WO | WO-03-050448 | 6/2003 |
| WO | WO-2004-017109 | 2/2004 |
| WO | WO-2004-0053531 | 6/2004 |
| WO | WO-2006-131924 A | 12/2006 |
| WO | WO-2008-146290 A2 | 12/2008 |
| WO | WO-2008-146290 A3 | 12/2008 |

OTHER PUBLICATIONS

International Search Report and Written Opinion for PCT/IL 08/01553, mailed Mar. 25, 2009.

International Search Report for PCT/IL2003/01042, mailed Jul. 29, 2004.

International Search Report for PCT/IL2008/000730, mailed Nov. 25, 2008.

Allen, et al., "A nearly ideal phosphor-converted white light-emitting diode" *Appl. Phys. Ltrs.* 92: 143309 (2008).

Zwanenburg et al., "41.2" High-efficiency LEDs for LCD Backlights, *SID 04 Digest.* p. 1222, ISSN/0004-0966X/04/3502-1222.

Smith-Gillespie, R., "LCD Backlighting Options and Design Considerations", SID Display Applications Tutorial, May 22, 2008.

Application Brief AB27 "For LCD Backlighting Luxeon DCC", Lumileds.

Jones-Bey, "High-Output LEDs: Solid-state lighting seeks a role in pictures", www.laserfocusworld.com/articles.

Fine, "Back Light Modular Unit (BLMu) for large LCD screens", SIL 2006.

International Search Report and Written Opinion for PCT/IL2008/01554, dated May 19, 2009.

\* cited by examiner

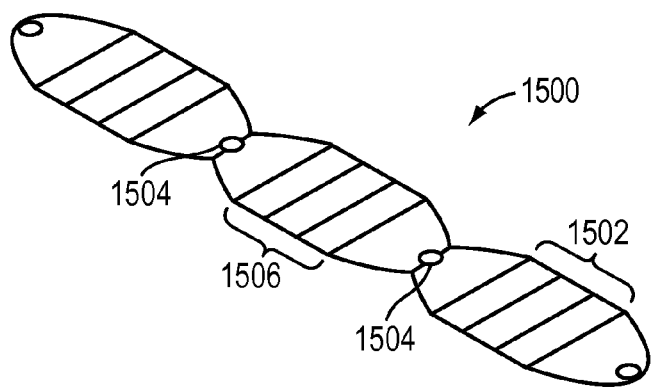
FIG. 15
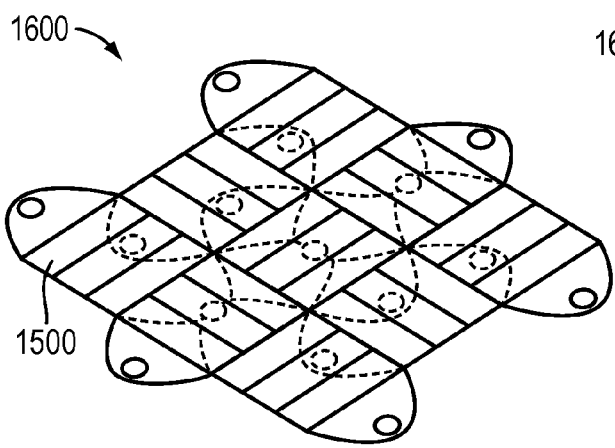 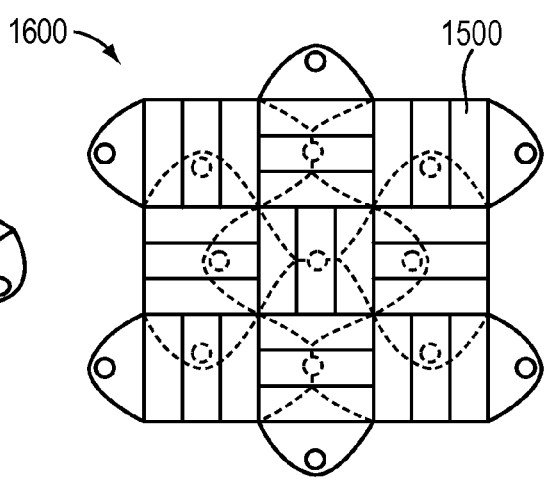
FIG. 16A   FIG. 16B

ELIMINATION OF STITCH ARTIFACTS IN A PLANAR ILLUMINATION AREA

CROSS-REFERENCE TO RELATED APPLICATIONS

This application claims priority to and the benefit of U.S. Provisional Patent Application No. 61/006,110, filed on Dec. 19, 2007; U.S. Provisional Patent Application No. 61/064,384, filed on Mar. 3, 2008; U.S. Provisional Patent Application No. 61/127,095, filed on May 9, 2008; and U.S. Provisional Patent Application No. 61/059,932, filed on Jun. 9, 2008. The entire disclosure of each of these applications is incorporated by reference herein.

TECHNICAL FIELD

In various embodiments, the invention relates to systems and methods for planar illumination using discrete waveguide-based lighting elements.

BACKGROUND

Using a point light source, such as a light-emitting diode (LED), to create a planar, uniformly emitting illuminating surface is difficult. Complex optical structures are required to distribute the light emitted from the LED evenly over the entire illuminating surface. An example of such a structure is a light guide that receives point-source light on an edge of the guide and distributes the light uniformly over a surface of the guide. As shown in FIG. 1, an edge-illuminated structure 100 may use a side-emitting point light source 102 that transmits light 104 to an edge 106 of a light guide 108. The light guide 108 distributes the transmitted light 104 to a top surface 110. The light source 102 is separate from the light guide 108.

The number of light sources that may illuminate the structure is limited, however, by the lengths of the light-guide edges and the dimensions of the light sources. As the surface area of the guide increases, more light sources than can physically fit on the light-guide edges may be required to maintain a constant illumination on the surface of the guide, ultimately setting an upper bound on the surface area. Moreover, an edge-illuminated light guide requires side-emitting, prepackaged light sources, thereby limiting the number and types of light sources that may be utilized. Further, the structure required to couple light from a side-emitting light source into an edge of the light guide may impede miniaturization of the planar illumination system.

A planar illumination surface constructed from a plurality of light guides may exhibit non-uniform light intensity at the borders between adjacent light guides, or "stitches." For example, the edges of the light guides may be non-uniform, allowing non-light-emitting gaps to form between the light guides. In addition, the direction of propagation of the light in two adjacent light guides may be different, creating a non-uniform pattern of light emission at the border. Finally, tiles that overlap one another may allow stray light to escape in the overlapping area. Clearly, a need exists for a planar illumination surface that is assembled from a plurality of light-guide elements and that emits a uniform light.

SUMMARY

Embodiments of the present invention prevent a non-uniform distribution of light from occurring at the borders between light-emitting elements. For example, the sidewalls of the light-guide elements may be polished, curved, or set at a 90-degree angle to either reflect or refract light as desired. An index-matching material may be deposited between adjacent light-guide elements and/or on the light-emitting surfaces of light-guide elements. A light-absorbing surface may be placed in the region where two light-guide elements overlap, and the light-guide elements may emit a changing distribution of light in the overlapping region.

In general, each light-guide element is an integrated monolithic light guide that includes spatially distinct in-coupling, concentration, propagation, and out-coupling regions. The in-coupling region collects the light emitted from the LED light source and the out-coupling region emits light to create the planar illumination. A light source may be adjacent to the in-coupling region of the element, but need not be positioned at its edges. The in-coupling region of one light-guide element may be at least partially covered by the light-emitting region of an adjacent element. In this manner, continuous illuminating surfaces of any desired size can be constructed by tiling the requisite number of light-guide elements, since unlit areas of one element will be occluded by overlying lit areas of an adjacent element.

In general, in a first aspect, a planar illumination area includes a first light-guide element including a first out-coupling region and a second light-guide element including a second out-coupling region. At least a portion of the second out-coupling region overlaps at least a portion of the first out-coupling to define an overlapping region having an area. The overlapping region emits a substantially uniform light output power over the area.

One or more of the following features may be included. The light output power of the overlapping region may differ from the light output power of the first and second out-coupling regions by no more than 10%. The change in light output power between the overlapping region and the first and second out-coupling regions may be gradual. The first out-coupling region may include light-scattering elements therein and the first and second out-coupling regions may overlap only partially. A density of the light-scattering elements outside the overlapping region may be greater than a density of the light-scattering elements inside the overlapping region. The density of the light-scattering elements inside the overlapping region may decrease along one direction.

The second out-coupling region may be transparent in the overlapping region. Light emitted from the first out-coupling region may pass through the second out-coupling region in the overlapping region. The first and second out-coupling regions may overlap only partially, and the planar illumination area may further include a third light-guide element including a third out-coupling region. A portion of the third out-coupling region may overlap a second portion of the second out-coupling region to define a second overlapping region having a second area. The second overlapping region may emit a substantially uniform light output power over the second area.

The first light-guide element may include a non-vertical sidewall and the second light-guide element may include a second, complementary non-vertical sidewall within the overlapping region. A top surface of the planar illumination area may be substantially flat. Additional light-guide elements may form, with the first and second light-guide elements, an array extending in first and second directions, and the light-guide elements may overlap in the first direction and may not overlap in the second direction, or may overlap in both the first and second directions. The overlapping region may include a light-absorbing material.

In general, in another aspect, a method of forming a planar illumination area includes providing a first light-guide element including a first out-coupling region. At least a portion of the first light-guide element is overlapped with a second light-guide element including a second out-coupling region, thereby forming an overlapping region including at least a portion of the first out-coupling region and the second out-coupling region. The overlapping region emits a substantially uniform light output power.

In general, in another aspect, a planar illumination area includes first and second light-guide elements including first and second sidewalls, respectively. An index-matching material covers the first and second sidewalls. The index of refraction of the index-matching material is approximately equal to an index of refraction of at least one of the first light-guide element or the second light-guide element.

One or more of the following features may be included. The second sidewall may be adjacent to the first sidewall and the index-matching materials may be located between the first and second sidewalls. The first and second light-guide elements may overlap and the index-matching material may cover the first and second light-guide elements to create a smooth surface thereover.

In general, in another aspect, a planar illumination area includes first and second light-guide elements including first and second polished sidewalls, respectively. The second polished sidewall is adjacent to the first polished sidewall. The second light-guide element receives light from the first light-guide element through the first polished sidewall and the second polished sidewall. An index-matching material may be located between the first and second sidewalls, and an index of refraction of the index-matching material may be approximately equal to an index of refraction of at least one of the first light-guide element or the second light-guide element.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 15 is a perspective view of a stripe planar-illumination unit in accordance with embodiments of the invention;

FIGS. 16A and 16B depict perspective and plan views, respectively, of a planar illumination area assembled from the illumination unit shown in FIG. 15;

DETAILED DESCRIPTION

1. Basic Architecture

Described herein are various embodiments of methods and systems for assembling a planar illumination area based on one or more discrete planar illumination units, various embodiments of different types of light-guide elements and LED sub-assemblies, and various embodiments of methods and systems for eliminating non-uniform "stitching" effects between planar illumination unit tiles.

Figure 1:
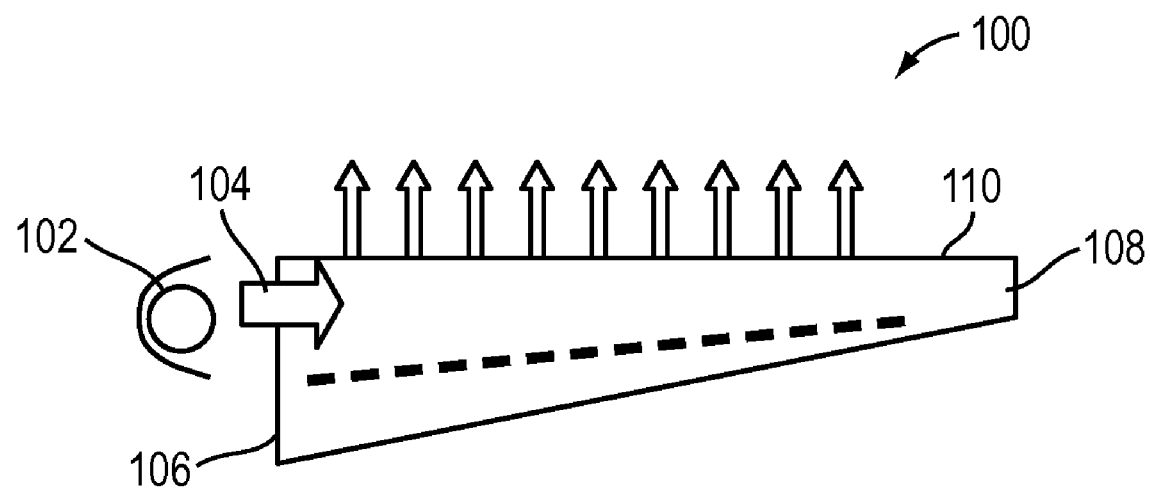
FIG. 1 is a schematic elevation of a prior-art structure with a side-emitting point light source in accordance with an embodiment of the invention.
Figure 2:
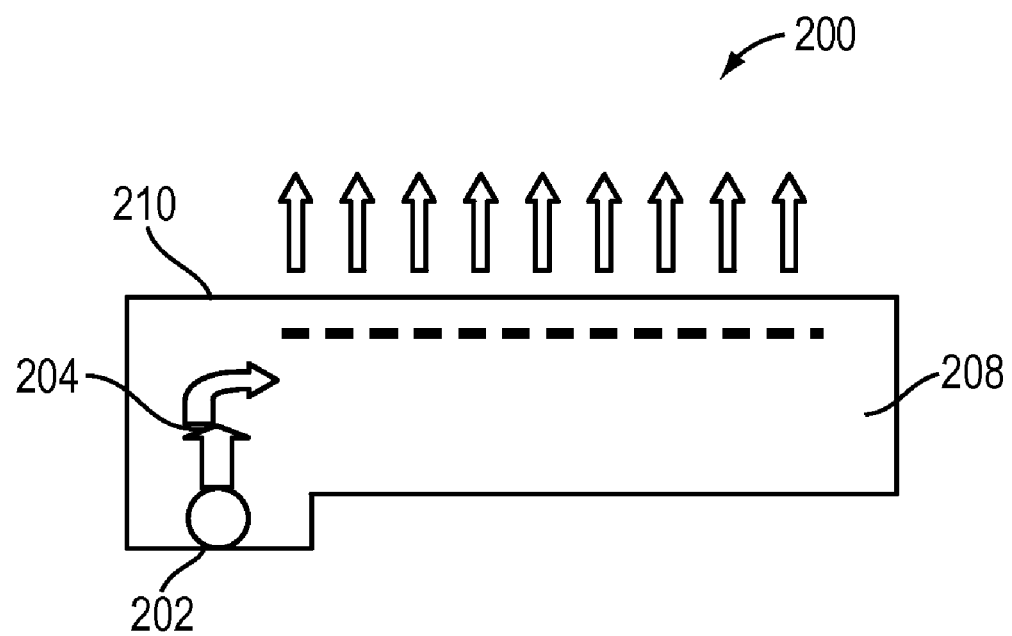
FIG. 2 is a schematic elevation of a structure with a Lambertian light source in accordance with an embodiment of the invention.

An advantage of the present invention, in various embodiments, is the ability to utilize upward-emitting (e.g., Lambertian) light sources. FIG. 2 generically illustrates a monolithic structure 200 with an integrated upward-emitting light source 202 embedded fully within a light guide 208. The light source 202 may have a Lambertian light distribution, and light 204 is substantially retained within the light guide 208 for emission through a surface 210 thereof.

In general, the present invention utilizes modular light-guide elements in which the light source is at least partially (and typically fully) embedded, facilitating the light retention and emission behavior shown in FIG. 2. The elements are tilable to facilitate uniformly illuminating surfaces of arbitrary size. A representative planar, tilable illumination unit 300 is illustrated in perspective in FIG. 3 and sectionally in FIG. 4. The illustrated planar illumination unit 300 includes a pair of opposed LED sub-assembly modules 302 and a light-guide element 304. As explained more fully below, the light-guide element 304 may include various regions—e.g., an in-coupling region 306, a concentration region 308, a propagation region 310, and an out-coupling region 312—that optimize capture, retention, and emission of light. Each LED sub-assembly module 302 desirably includes an LED light source at least partially packaged within the in-coupling region 306 of the light guide 304, as further described below.

Light may be emitted upward from the LED sources, which may be Lambertian sources, into the in-coupling region 306 of the light guide 304, in which case the light propagates in lateral directions (i.e., is confined within the thickness of the light guide 304). The in-coupling and concentration regions 306, 308 of the light-guide element 304 in effect gather the light from the light source and direct it, with minimal losses, toward the propagation region 310. In particular, the concentration region 308 orients toward the out-coupling region 312 a substantial fraction of multidirectional light received in the in-coupling region 306. Light from the concentration region 308 traverses the propagation region 310 and advances to the light-emitting out-coupling region 312, reaching the interface 314 between the out-coupling region 312 and the propagation region 310 with a distribution suitable for the desired functionality of the light source. For example, in order to obtain a uniform light emission across the illuminating region, a uniform distribution of the light across the interface 314 is preferred. It should be stressed that the interface 314 is typically not a sharp boundary, but rather a gradient transition established by, for example, a change in the density of scattering particles that occurs over a distinct zone. The same is true of the out-coupling sub-regions described below.

In the out-coupling region 312, the light is emitted from the light guide, resulting in planar illumination with desired properties that depend on a particular application. For example, substantially uniform illumination over the entire area of the out-coupling region may be preferred for back-lighting applications. (By "substantially uniform" is meant no more than 10% variation in output intensity.) Monolithic waveguides and methods for their manufacture are described in detail in, for example, the '110 application (titled "Waveguide Sheet and Method for Manufacturing the Same") referenced above.

Figure 5:
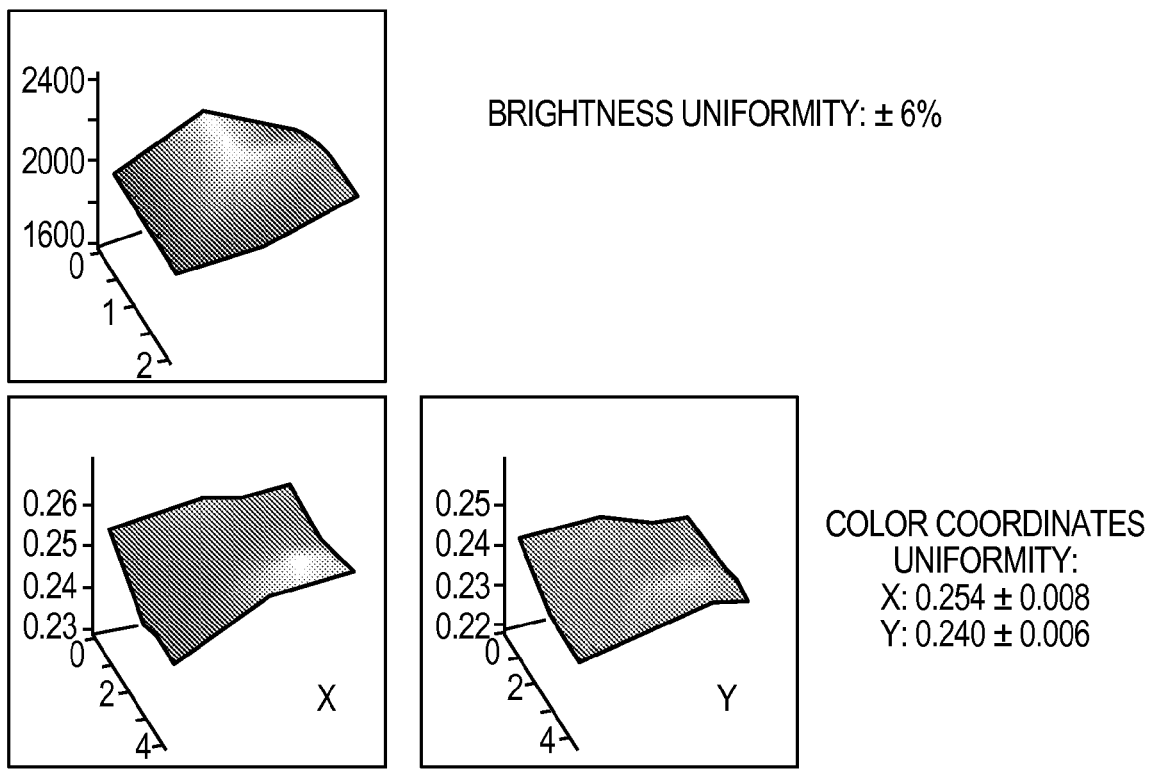
FIG. 5 depicts graphs of exemplary properties of planar illumination systems.

Exemplary properties exhibited by planar illumination systems according to embodiments of the present invention are shown in FIG. 5. The planar illumination system whose behavior is illustrated in FIG. 5 includes, as discrete light sources, two RGB midsize LED chips, and the thickness of the system is approximately 5 mm. These planar illumination systems exhibit a brightness of approximately 2060 candelas per square meter (nits) with a brightness non-uniformity of only approximately ±6%. For (x, y) color coordinates of (0.254, 0.240), the color uniformity ($\Delta x$, $\Delta y$) may be approximately (±0.008, ±0.006).

Figure 3:
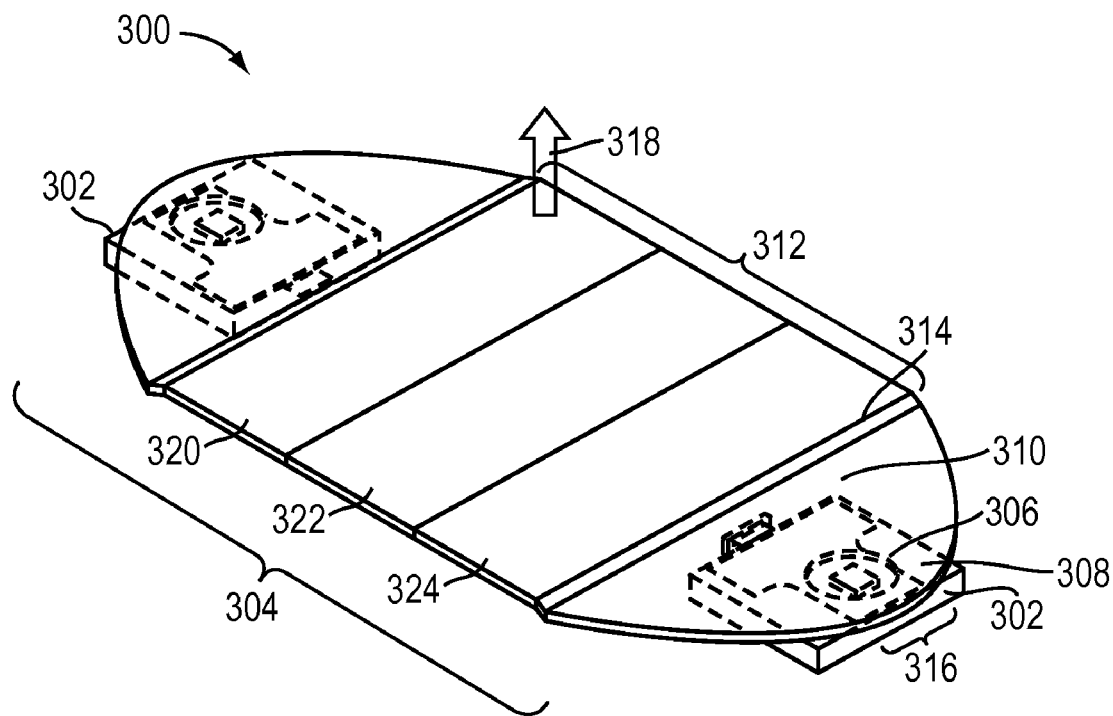
FIGS. 3 and 4 depict perspective and elevational views, respectively, of an illustrative embodiment of a planar illumination unit.
Figure 4:
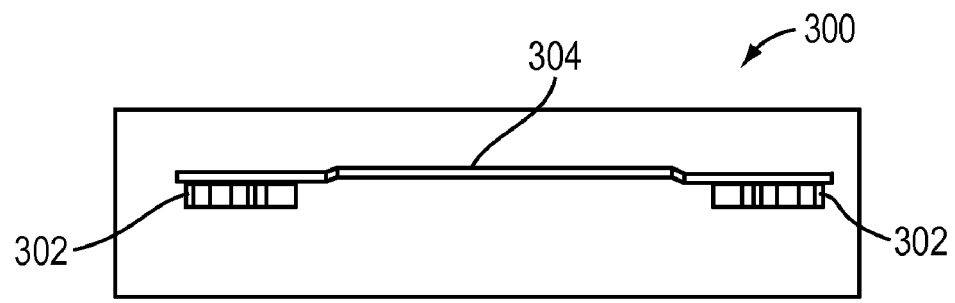

With renewed reference to FIGS. 3 and 4, the depicted cylindrical shape of the in-coupling region 306 is for illustrative purposes only, and other shapes may be used. For example, the in-coupling region 306 may include two regions having annular or cylindrical profiles. One or more light sources, for example, white, single color, red-green-blue (RGB), or infrared (IR) light sources, as well as either bare-die or packaged LEDs, may be mounted at the back of the in-coupling region 306. These light sources emit light that is coupled into the light guide through the in-coupling region 306, which alters the direction of the light emitted by the LEDs to couple the light into the light-guide element 304.

Once coupled into the light-guide element 304, the light may be emitted in all directions along the periphery of the in-coupling region 306. In-coupling is described in U.S. application Ser. No. 12/155,090, titled "Method and Device for Providing Circumferential Illumination," filed on Apr. 29, 2008, which is hereby incorporated by reference in its entirety. For example, the in-coupling region 306 may take the form of an optical funnel. The funnel receives light from one or more light-emitting elements and transmits the light into the propagation region 310. The funnel may take the form of a surface-emitting waveguide or a surface-emitting optical cavity that receives the light generated by one or more LEDs through an entry surface, distributes it within an internal volume, and emits it through an exit surface. To prevent or reduce optical losses, the in-coupling region 306 and/or concentration region 308 may include one or more reflectors (e.g., edge reflectors).

Because the out-coupling region 312 may be located on only one side of the in-coupling region 306, the light that is emitted from the in-coupling region 306 on a side 316 opposite the out-coupling region 312 may be redirected toward the out-coupling region 312. This redirection may occur in the concentration region 308, where a concentrator may direct the light toward the out-coupling region 312, as described in greater detail below. In one embodiment, there is a concentrator for each LED, such as, for example, two LEDs and two concentrators. In FIG. 3, one embodiment of a parabola-shaped concentration region 308 is shown, but other shapes may be used. The center of the parabola formed by the concentration region 308 may be the center of the in-coupling region 306.

The propagation region 310 allows the light transmitted from the in-coupling region 306 and concentration region 308 to propagate freely toward the out-coupling region 312. In the out-coupling region 312, the light is turned in an upward direction (as indicated at 318) from the planar illumination unit 300 to the outside world. This light may then illuminate a planar segment of a larger illumination surface formed by multiple tiled illumination units 300 such as, for example, a surface in an LCD backlight application. The out-coupling region 312 is depicted as square-shaped in FIG. 3, but, for illustrative purposes, is shown as three rectangular sub-regions 320, 322, 324. These sub-regions 320, 322, 324 are not separate regions, but instead show, in one embodiment, a representative distribution of dispersed particles within the out-coupling region 312. These particles facilitate emission of the light by serving as scatterers, typically scattering optical radiation in more than one direction. When light is scattered by a particle such that the impinging angle is below the critical angle, no total internal reflection occurs and the scattered light is emitted through the surface of out-coupling region 312 along the direction 318.

The light-scattering particles may be beads, e.g., glass beads, or other ceramic particles, rubber particles, silica particles, particles including or consisting essentially of inorganic materials such as $BaSO_4$ or $TiO_2$, particles including or consisting essentially of a phosphor material (as further described below), and the like. In an embodiment, the light-scattering particles are substantially or even completely non-phosphorescent. Such non-phosphorescent particles merely scatter light without converting the wavelength of any of the light striking the particles. The term "light-scattering particles" may also refer to non-solid objects embedded in the waveguide material from which core structure are made, provided that such objects are capable of scattering the light. Representative example of suitable non-solid objects include, without limitation, closed voids within the core structures, e.g., air bubbles, and/or droplets of liquid embedded within the core structures. The light-scattering particles may also be organic or biological particles, such as, but not limited to, liposomes. In some embodiments, optical elements such as microlenses are utilized in conjunction with, or even instead of, light-scattering particles.

Typically, the particles are concentrated toward the center sub-region 322 of the out-coupling region 312—i.e., the particle concentration in the center sub-region 322 exceeds the concentration in the peripheral sub-regions 320, 324, but typically the particle-concentration transition among sub-regions is gradual rather than abrupt.

The same scattering material may be used for each region 306, 308, 310, 312 but at different concentrations appropriate to the functions of the different regions. The out-coupling region 312, for example, typically contains the greatest concentration of particles. The concentration region 308 may contain particles graded in concentration to direct light to the propagation region 310, which typically contains no particles.

The concentration region 308 transfers the light that is coupled into the light-guide element 304 so that it propagates toward the propagation region 310. In addition, the concentration region 308 may enable the light from the in-coupling region 306 to the out-coupling region 312 to achieve the required distribution of light intensity. The in-coupling 306, concentration 308, and propagation 310 regions may be designed to evenly distribute light at the entrance 314 to the out-coupling region 312. In other words, a standard structure for emitting light from the out-coupling region 312 may enforce a uniform distribution of intensity at the entrance 314 to the out-coupling region 312.

Figure 6:
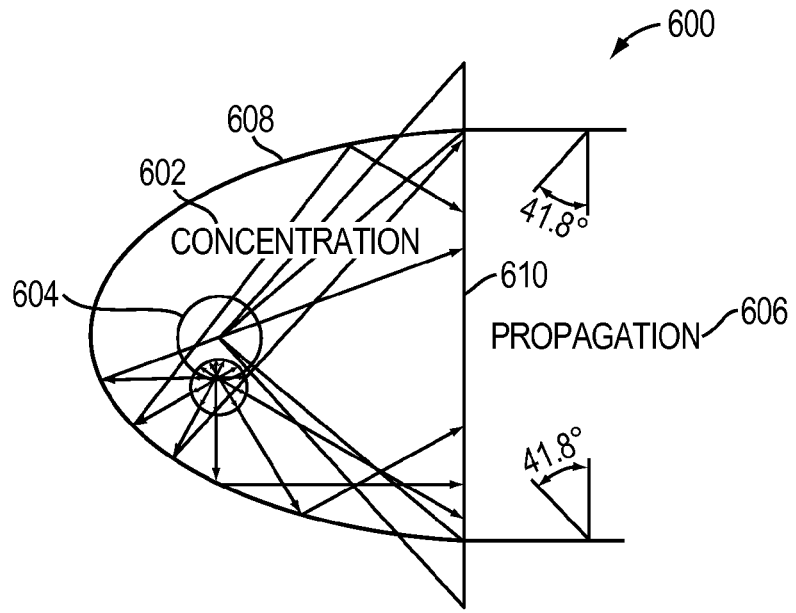
FIG. 6 schematically depicts a concentration region and its behavior in accordance with an embodiment of the invention.

FIG. 6 illustrates an exemplary portion of a light-guide element 600 including a concentration region 602, an in-coupling region 604, and a propagation region 606 that increases the amount and uniformity of light intensity at the interface 610 to the out-coupling region by advancing the light toward the out-coupling region in a uniform manner. A side 608 of the light-guide element in the concentration region 602 has a parabolic shape and/or a reflective coating. The center of the parabola formed by the concentration region 602 may be the center of the in-coupling region 604. Light that enters the light-guide element 600 at the in-coupling region 604 may spread in all directions in the light-guide element 600. The angular spread, as indicated in the figure, is largely confined to the concentration region 602 and directed toward the propagation region 606 due to total internal reflection at the sidewall 608. The critical angle may be, for example, 41.8 degrees, such that any injected light propagating toward the sidewall 608 at or below this angle will ultimately reach the entrance 610 of the propagation region 606, via a single or multiple reflections from the sidewall. At the entrance 610 to the propagation region 606, the light intensity will be a superposition of the light directly propagating to the propagation region 606 from the in-coupling region 604 and the light reflected from the sidewall 608. Desirably, the light intensity at the entrance 610 of the propagation region 606 is substantially uniform. In this way, the light may propagate through the propagation region 606 and reach the entrance to the out-coupling region with a uniform intensity distribution.

Because the refractive index of air is about one, the light-guide element 304 may be made using a waveguide material having a refractive index greater than one. Representative examples of materials suitable for the light-guide element include 304, without limitation, TPU (aliphatic), which has a refractive index of about 1.50; TPU (aromatic), which has a refractive index of from about 1.58 to about 1.60; amorphous nylon such as the GRILAMID material supplied by EMS Grivory (e.g., GRILAMID TR90), which has a refractive index of about 1.54; the TPX (PMP) material supplied by Mitsui, which has a refractive index of about 1.46; PVDF, which has a refractive index of about 1.34; other thermoplastic fluorocarbon polymers; the STYROLUX (UV stabilized) material marketed by BASF, which has a refractive index of about 1.58; polymethyl methacrylate (PMMA) with a refractive index of about 1.5; and polycarbonate with a refractive index of about 1.5. As explained in the '090 application, the light-guide element 304 may consist of a single (core) layer or have a sandwich structure in which a core layer lies between opposed cladding layers. The thickness of the cladding layers (if present) is typically from about 10 μm to about 100 μm. The thickness of the core layer may vary from approximately 400 μm to approximately 1300 μm.

In various embodiments, the material from which the light-guide elements 304 are formed is transparent, is at least somewhat flexible, possesses at least some elongation capability, and/or is capable of being produced in a thermoplastic process. Very flexible materials such as silicone may be suitable, as well as less flexible materials such as PMMA or polycarbonate. The degree to which the chosen material is capable of bending may depend on the mode of assembling sets of elements into a surface. For example, some assembly procedures may require little or no bending. In other embodiments, the material is not inherently flexible; even a relatively stiff material, if thin enough, may exhibit sufficient mechanical flexibility to accommodate assembly as described herein. The waveguide elements may be manufactured by any suitable technique including, without limitation, co-extrusion, die cutting, co-injection molding, or melting together side-by-side in order to introduce bends that will facilitate assembly.

Each region 306, 308, 310, 312 of the light-guide element 304 may include phosphorescent materials that change the wavelength of the light striking them to another wavelength, thereby, for example, altering the color of the light. In this manner, white light may be produced by altering the wavelength of some of the light emitted from the light sources. During propagation to the out-coupling region 312, portions of the light may be absorbed by the phosphorescent material, which then emits light of a different wavelength. Light with different wavelengths may be collectively emitted by the out-coupling region, forming white light.

2. Light-Guide Element Configurations

Figure 7:
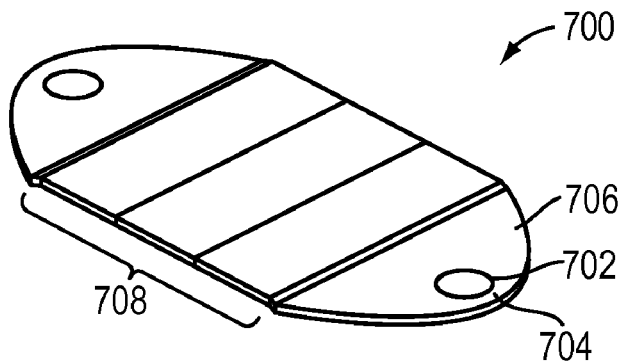
FIGS. 7-11 are perspective view of a two-source, one-source, asymmetric, two-source folded, and single-source folded light-guide elements, respectively, in accordance with embodiments of the invention.

FIG. 7 illustrates one embodiment of a two-source light-guide element 700 in accordance with the present invention. The two-source light-guide element 700 has an in-coupling region 702, a concentration region 704, a propagation region 706, and an out-coupling region 708. The out-coupling region 708 may be square-shaped, as shown, thereby allowing a first light-guide element 700 to be tiled next to a second, similar light-guide element 700 rotated by 90 degrees. In this way, and as described below, the out-coupling region 708 of the first light-guide element 700 may be positioned above the in-coupling region 702, concentration region 704, and propagation region 706 of the second light-guide element 700, thereby hiding those regions of the second light-guide element; the result of tiling in this fashion is to produce a uniform illumination surface without dark regions. In alternative embodiments, however, the out-coupling region 708 is rectangular.

Figure 8:
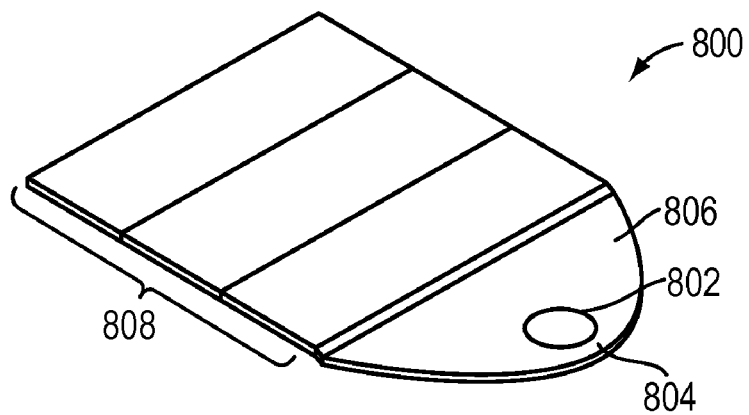

FIG. 8 illustrates, in another embodiment, a single-source light-guide element 800 that has only a single in-coupling region 802 for receiving light from a single source. The single-source light-guide element 800 also includes a concentration region 804, a propagation region 806, and an out-coupling region 808. Light propagates from the in-coupling region 802 to the out-coupling region 808 in a single direction. As with the two-source light-guide element 700, assembly of a planar illumination area using single-source light-guide elements 800 does not require them to be bent (since they may be tiled in a manner that allows the out-coupling region 808 to occlude the concentration region 806 of an adjacent element). For square out-coupling regions 808, the number of discrete light-guide element 800 needed for assembly of the tiled planar illumination area increases with the square of the increase in the surface diagonal of the illumination surface. (Like the two-source light-guide element 700, the out-coupling region 808 is, in various embodiments, rectangular or square-shaped.)

Figure 9:
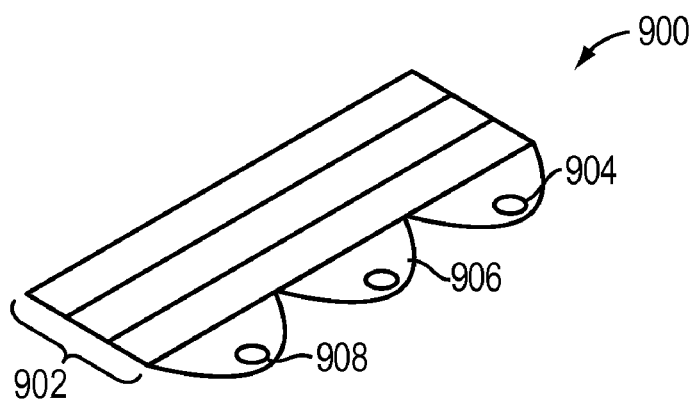

Light-guide elements in accordance with the invention may have multiple light sources arranged in a single side of the element, as illustrated in FIG. 9. The depicted asymmetric light-guide element 900 has the form of a stripe with a single out-coupling region 902 and a plurality of adjacent in-coupling 904, propagation 906, and concentration regions 908. As illustrated, the in-coupling regions are disposed on only one side of the out-coupling region 902, and light therefore reaches the out-coupling region 902 from only one side rather than from two. The asymmetric light-guide element 900 may be used to assemble a planar illumination area of any size. The out-coupling region 902 is typically rectangular, as illustrated, but may be square or any other shape.

Figure 10:
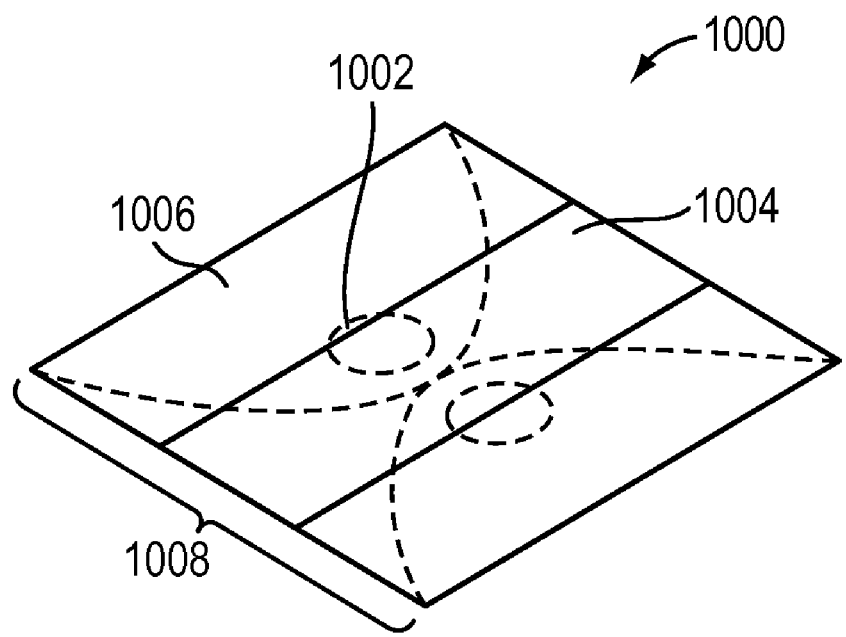

In some embodiments, the light-guide elements are folded rather than overlapped in assembly. FIG. 10 shows, in one embodiment, a folded two-source two-direction light-guide element 1000. The folded element 1000 has the configuration of two-source light-guide element 700, but is folded over on itself such that the two light sources, in-coupling region 1002, concentration region 1004, and propagation region 1006 are hidden under the light-guide element's out-coupling region 1008. The folded two-source light-guide element 1000 may have a square-shaped out-coupling region 1008; the symmetry of the square shape is desirable in allowing the folded two-source light-guide elements 1000 to be tiled side-by-side. In one embodiment, each folded two-source light-guide element 1000 is rotated 90 degrees with respect to a neighboring element 1000 so that each folded side of one element 1000 abuts an unfolded side of a neighboring element 1000. The number of square two-source light-guide elements 1000 needed for a planar illumination area assembly increases with the square of the increase in the area diagonal.

Figure 11:
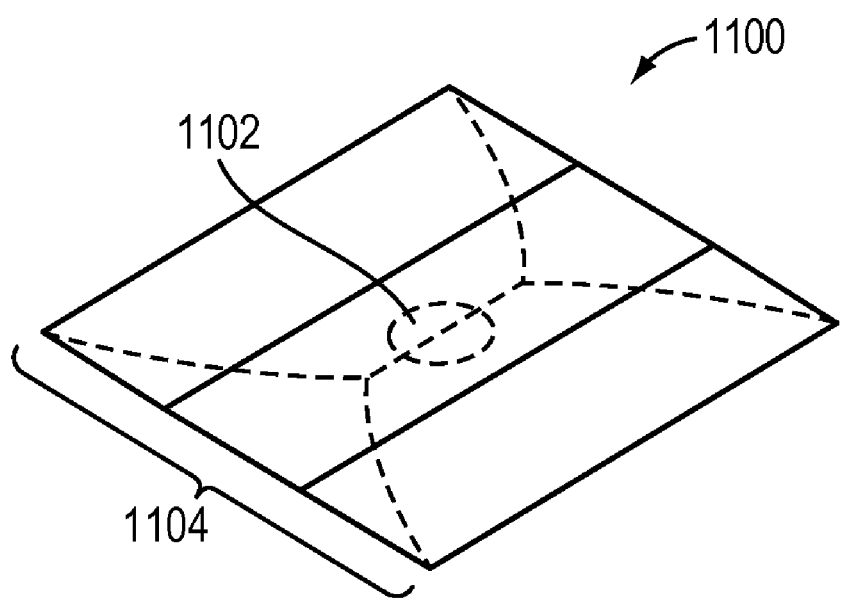

FIG. 11 shows a folded single-source, two-direction light-guide element 1100. This light-guide element is similar to the folded two-source light-guide element 1000, except that only one light source is present, and the in-coupling regions 1102 overlap. Light propagates from the light source to the out-coupling region 1104 from opposite directions, i.e., through the in-coupling regions 1102. The number of square one-source light-guide elements 1100 needed for the planar illumination area assembly increases with the square of the increase in the area diagonal.

In various embodiments, the two-source light-guide element 700, single-source light-guide element 800, asymmetric light-guide element 900, folded two-source light-guide element 1000, and/or folded one-source light-guide element 1100 may be modified to change their properties in accordance with functional requirements. For example, the manner in which the in-coupling, concentration, and propagation regions mate with the out-coupling region may be modified. In one embodiment, light from a single source is coupled to an out-coupling region from two or more directions, thereby enabling more efficient and uniform out-coupling of the light. Other modifications may be made as well, such as changing the shape of the out-coupling region to be either square or rectangular. A square shape imparts rotational symmetry, which may simplify assembly of the planar illumination, while a rectangular shape facilitates assembly of a rectangular planar illumination of any desired size. In addition, the flexibility of a light-guide element may be adjusted to comply with a particular tiling or folding technique, which may require that a light-guide element be bent to hide a non-illuminated area of an adjacent light-guide element. A light-guide element may also have more than one light source. The size of the light-guide element may be adjusted to change the total number of light-guide elements required to assemble a planar illumination area; for example, a single planar configuration may utilize elements having different sizes or configurations.

3. Light-Guide Element Tiling and Planar Illumination Area Assembly

In accordance with embodiments of the present invention, an area of a light-guide element that does not emit light may be occluded by (i.e., hidden behind) an area of another light-guide element that does emit light; in particular, in-coupling, concentration, and/or propagation regions may be hidden under an out-coupling region. For example, the out-coupling region may be coupled to an in-coupling region on a different light-guide element. Accordingly, a large, uniformly illuminated surface may be built even though some areas of the light-guide element used to create the surface do not emit light. The surface may be configured in a variety of shapes, including curved shapes or spheres.

The planar illumination area may be used to provide substantially uniform illumination in a variety of applications. In one embodiment, the planar illumination area is used as a luminaire for lighting applications. In another embodiment, the planar illumination area is used as a backlight unit for a display device, e.g., a liquid crystal display (LCD). In this embodiment, the LCD includes a plurality of pixels and is placed in front of the light-guide elements.

Each planar illumination unit may represent an independent unit that produces and/or transfers light. A planar illumination area may be assembled from planar illumination units according to any of various suitable assembly techniques, such as segment assembly, stripe assembly, tile assembly, or folded architecture assembly, each described in more detail below.

Segment assembly is a technique wherein, for the light-guide elements described above, each light-guide element is simply placed face-up on a surface. The out-coupling regions of some light-guide elements are arranged to cover the in-coupling regions of other light-guide elements previously put in place. For some light-guide elements, the out-coupling regions of previously placed light-guide elements are lifted so that the in-coupling regions of new light-guide elements can be slipped underneath. This lifting step may require that at least some of the light-guide elements exhibit sufficient flexibility to facilitate lifting. In one embodiment, each light-guide element has a rectangular out-coupling region that hides zero, one, or two light sources.

Figure 12:
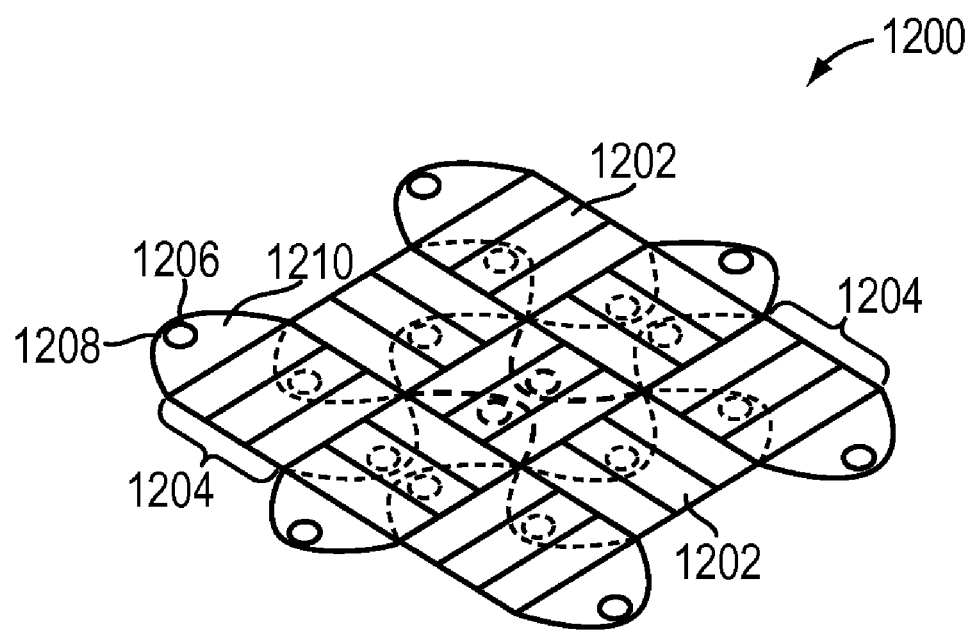
FIGS. 12-14 depict various views of segment-assembly planar illumination areas in accordance with an embodiment of the invention.

FIG. 12 illustrates an example of the segment assembly technique wherein a planar illumination area 1200 is constructed from nine discrete light-guide elements 1202, which correspond to element 700 (but may be, in various embodiments, any of the light-guide elements described above). The structure 1200 emits light only from the square or rectangular out-coupling regions 1204 of the light-guide elements 1202. The in-coupling, concentration, and propagation regions 1206, 1208, and 1210 of the light-guide elements 1202 do not emit light.

Figure 13:
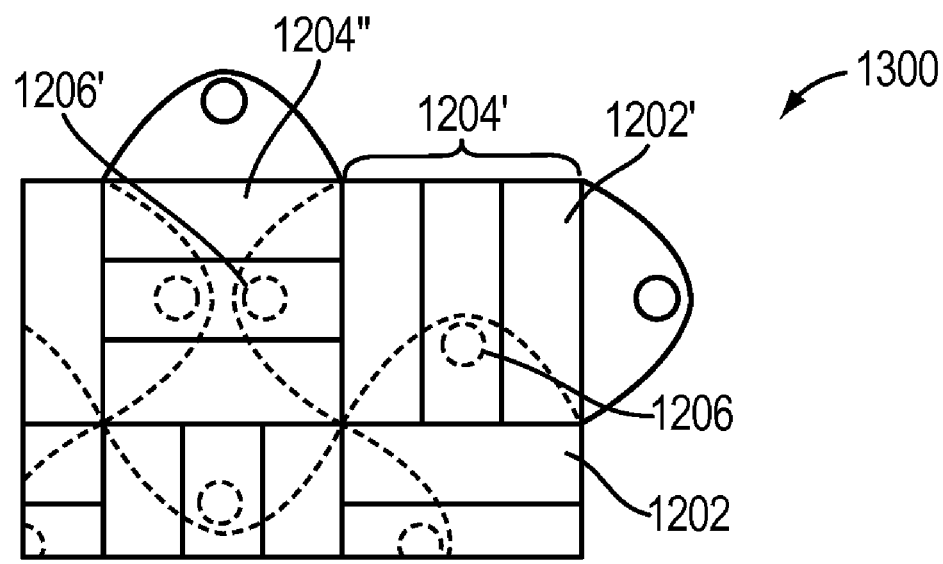

FIG. 13 illustrates a portion 1300 of the planar illumination area 1200 in greater detail. An in-coupling region 1206 of first light-guide element 1202 is hidden under a light-emitting out-coupling region 1204' of a second light-guide element 1202'. The out-coupling region 1204" of an adjacent element receives light from another in-coupling region 1206' of element 1202'.

Figure 14:
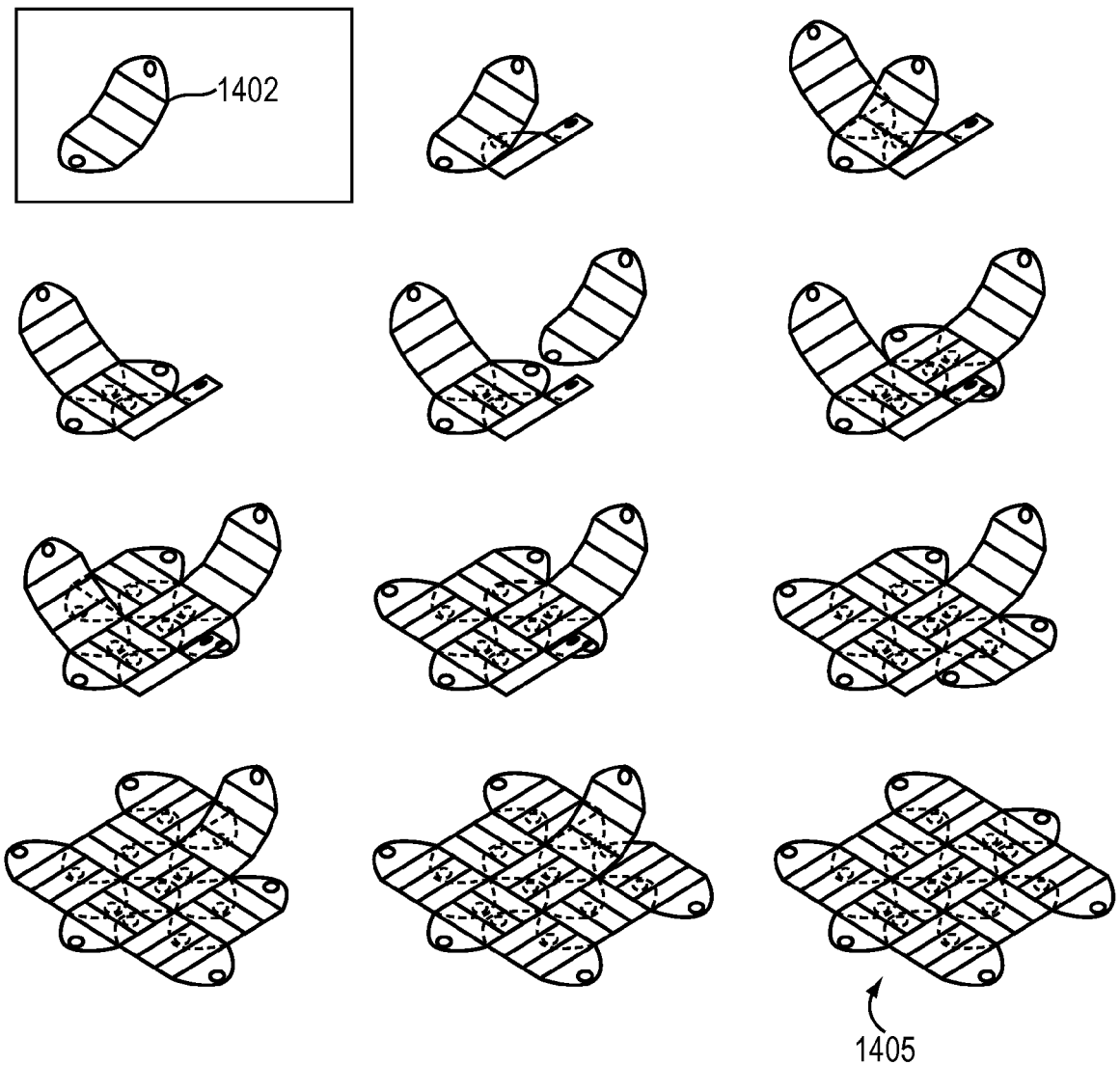

FIG. 14 illustrates another segment assembly technique for constructing a large planar illumination area from discrete light-guide elements 1402. In this example, nine light-guide element 1402 are assembled in the manner shown into a three-by-three grid 1405 such that the non-light-emitting portions of each light-guide element 1402 are hidden behind light-emitting portions of an adjacent light-guide element 1402. The integration principle illustrated in FIG. 14 may be applied to planar illumination areas of arbitrary size, shape, and grid number.

Another light-source element configuration is illustrated in FIG. 15. The symmetric stripe element 500 represents a daisy-chaining of light-guide elements 1502 such that each light-guide element 1502 shares a light source with a neighboring light-guide element 1502. As a result, in-coupling regions 1504 of neighboring light-guide elements 1504 overlap, and a stripe of N light-guide elements requires only N+1 light sources. Each out-coupling region 1506, however, receives light from two directions propagated from in-coupling regions 1504. The out-coupling region 1506 may be square or rectangular. The light-guide elements 1502 may need to be bent to assemble a planar illumination area with stripes 1500. The number of discrete light-guide elements needed for the planar illumination area assembly may increase linearly with an increase in the area diagonal.

Referring to FIGS. 16A and 16B, a planar illumination area 1600 may be assembled from stripes 1500 by arranging a first set of stripes 1500 adjacently, and then weaving a second set of adjacent stripes perpendicularly through the first set of stripes. The over-and-under weaving is carried out so as to place an out-coupling region 1506 over each in-coupling region 1504 and its associated concentration and propagation regions. This procedure generally requires that the light-guide elements 1502 exhibit some flexibility to permit interweaving to take place.

Figure 17A:
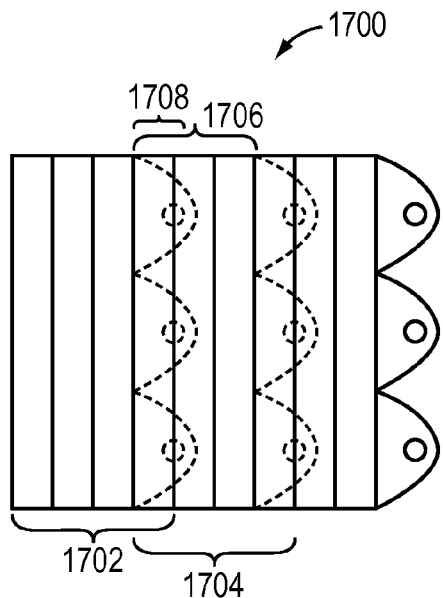
FIGS. 17A and 17B depict perspective and plan views, respectively, of a planar illumination area assembled from asymmetric stripe elements in accordance with an embodiment of the invention.
Figure 17B:
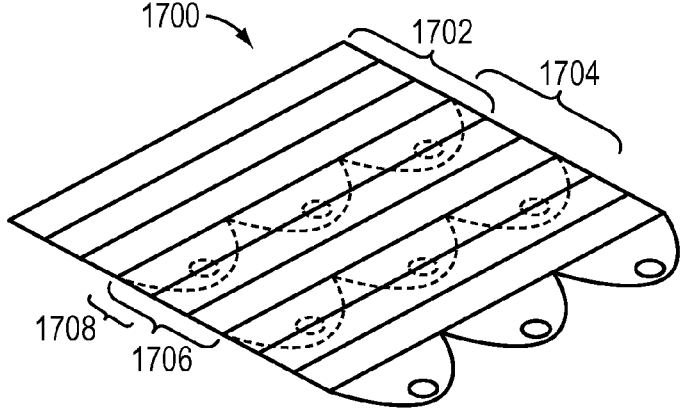

FIGS. 17A and 17B show an exemplary planar illumination area 1700 assembled using asymmetric light-guide elements 1702, which correspond to the elements 900 shown in FIG. 9. A first asymmetric light-guide element 1702 is placed at the end edge of the illumination area. A second asymmetric light-guide element 1704 is placed next to the first asymmetric light-guide element 1702 such that the out-coupling region 1706 of the second asymmetric light-guide element 1704 covers the in-coupling regions 1708 of the asymmetric light-guide element 1702. Other asymmetric light-guide elements are added in the same fashion. This assembly technique does not require element flexibility because each tile may be pre-formed to a desired form factor, and thus the asymmetric light-guide elements 1702 need not be bent. In another embodiment, single-source light-guide elements (corresponding to the elements 800 shown in FIG. 8) are placed adjacent to each other to form a group of elements similar to an asymmetric light-guide element 1702, and then this group of elements is used to form a structure corresponding to the planar illumination area 1700.

Figure 18:
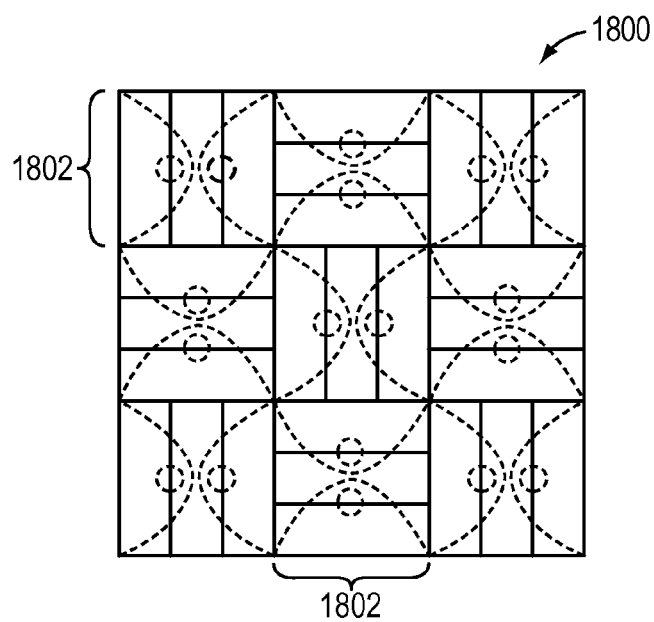
FIG. 18 is a plan view of a planar illumination area formed from folded two-source light-guide elements in accordance with an embodiment of the invention.

FIG. 18 shows how a planar illumination area 1800 may be formed from folded two-source light-guide elements 1802 (corresponding to the elements 1000 shown in FIG. 10), which are simply tiled adjacently. The planar illumination area 1800 may also formed from folded one-source light-guide elements (corresponding to the elements 1100 shown in FIG. 11). The folded light-guide elements 1802 do not require hiding one light-guide element behind another adjacent light-guide element because the out-coupling region of each folded light-guide element hides the in-coupling region of that light-guide element.

Figure 19:
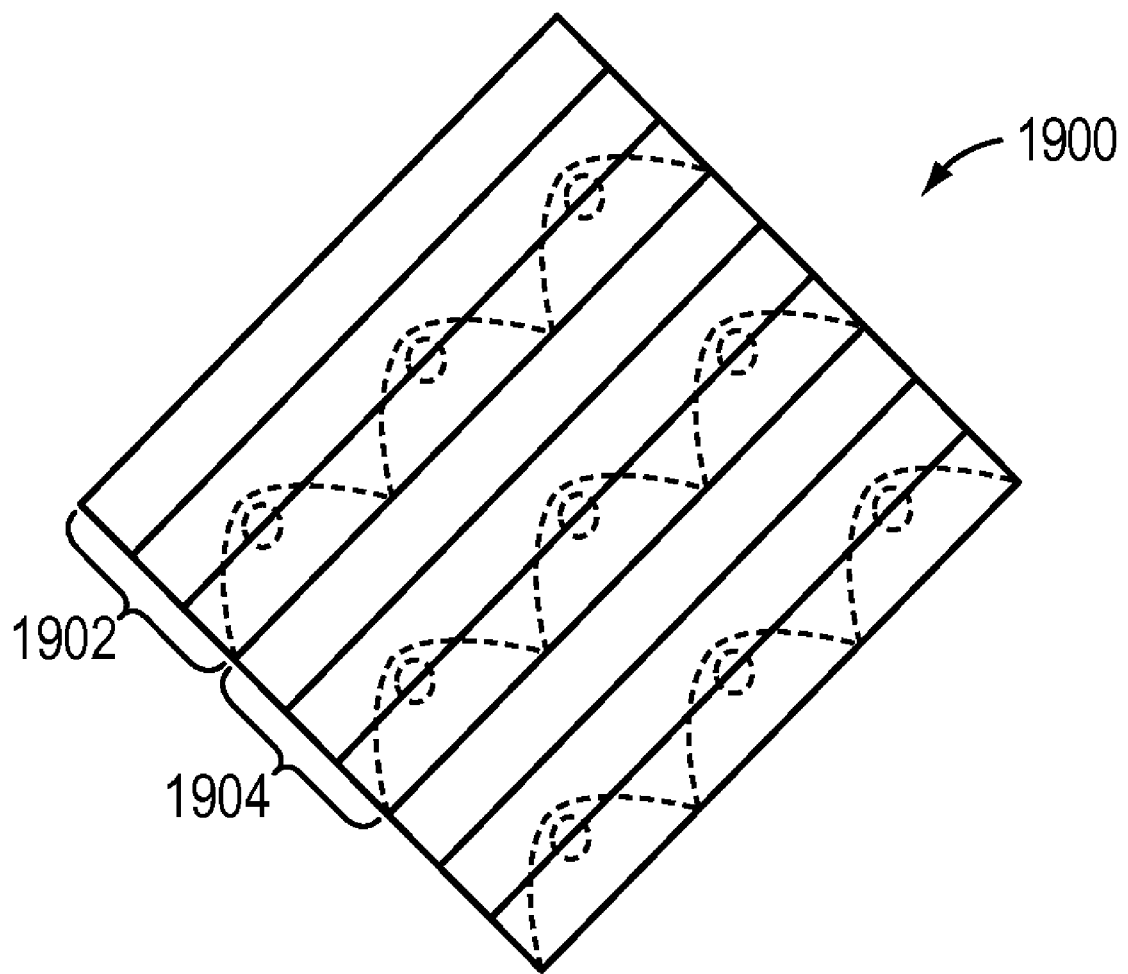
FIG. 19 is a perspective view of a planar illumination area formed from folded asymmetric light-guide elements in accordance with an embodiment of the invention.

FIG. 19 shows a planar illumination area 1900 assembled using a multiple-light-source light-guide element 1902 (similar to the multiple-light-source element 900 shown in FIG. 9) that has its in-coupling, concentration, and propagation regions folded underneath its out-coupling region. Because the out-coupling region of one folded multiple-light-source light-guide element 1902 need not be used to hide the in-coupling, concentration, and propagation regions of an adjacent folded multiple-light-source light-guide element 1904, the element 1902 can simply be tiled adjacently; it is not necessary to bend the elements 1902 to achieve planar assembly.

4. Stitching

A planar illumination area assembled from a plurality of light-guide elements as discussed above may emit non-uniform light at the boundary regions, or "stitches," between tiles.

There are several reasons why the stitches may emit non-uniform light. For example, the non-uniform light may be due to the configuration of the light-guide elements, stray light in the system, and/or roughness or roundness in a sidewall of a light-guide element owing to, for example, the light-guide elements themselves or their method of assembly. The structure of a planar illumination area that places each light-guide element perpendicular to an adjacent light-guide element may create a problem of uniformity in the borders of the light-guide elements due to the positioning of the axis of the progress of the light between the adjacent tiles. The direction of the light emission from the tile in the out-coupling region may be similar to the direction of the progress of the light in the light-guide. When the tiles are positioned next to one another, a lack of uniformity may be created due to the non-continuity of the direction of the light emission between the tiles.

Figure 20:
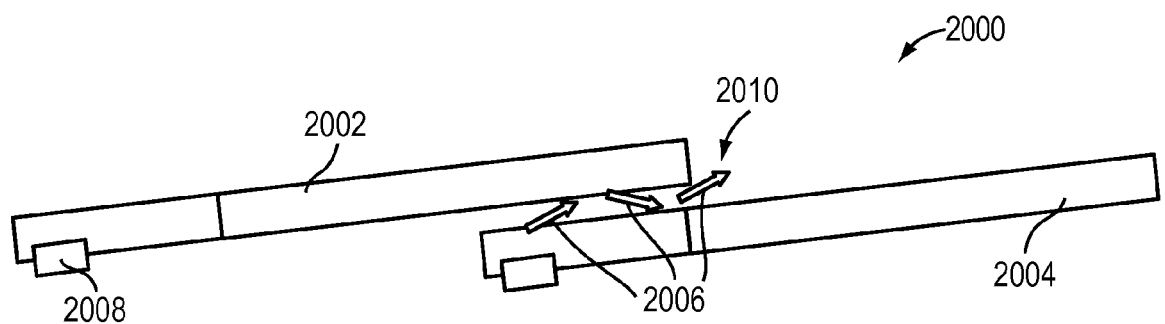
FIGS. 20-22 depict cross-sections of non-uniform light emitted by a planar illumination area in accordance with embodiments of the invention.

The non-uniform light may also be due to stray light in the system. FIG. 20 illustrates a cross-section of a planar illumination area 2000 in which one light-guide element 2002 is laid on the surface of an adjacent light-guide element 2004. This configuration may allow stray light 2010 to pass from an in-coupling region 2008 of the first light-guide element, between the two light-guide elements 2002, 2004, and then to emerge on the outside 2010 of the planar illumination area 2000.

Figure 21:
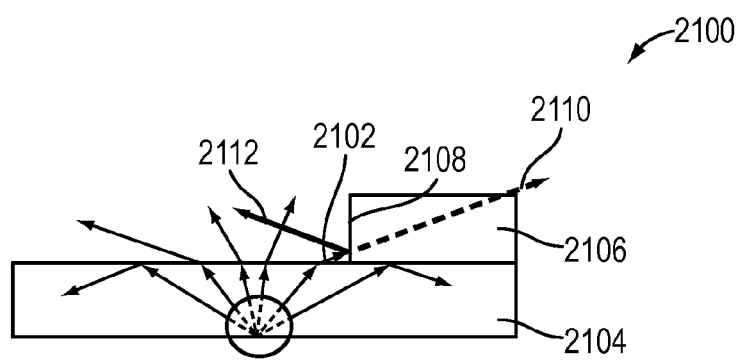

In addition, as seen in the structure 2100 of FIG. 21, light 2102 emitted from a lower light-guide element 2104 close to the edge of an upper light-guide element 2106 may meet and be reflected from a sidewall 2108 of the upper light-guide element 2106. The original trajectory 2110 of the light 2102 may thus be changed to the reflected path 2112. Thus, the sidewall 2108 of the upper light-guide element 2106 may create a non-uniform light pattern near it because it reflects emitted light 2102 away from it.

Figure 22:
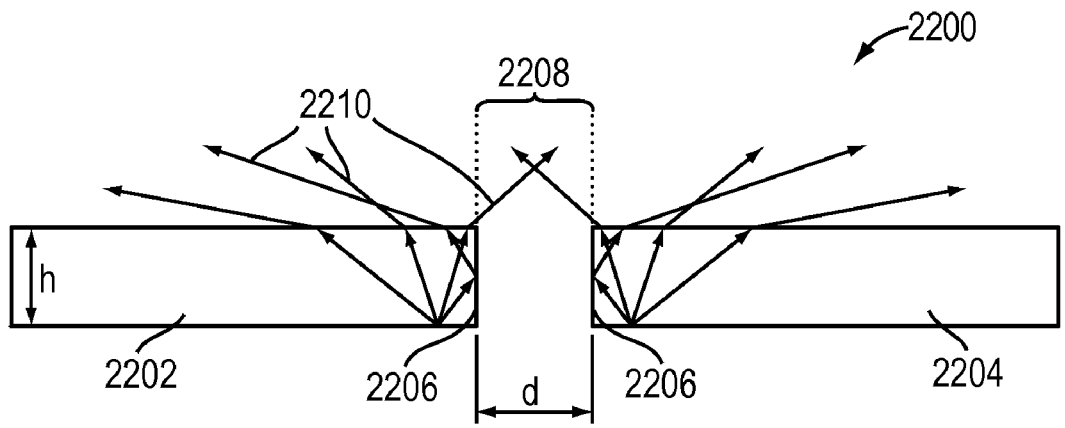

Non-uniform light may also arise due to roughness and/or roundness of the sidewall of a light-guide element. FIG. 22 illustrates a structure 2200 in which two adjacent light-guide elements 2202, 2204 are separated by a distance d because of, for example, imperfections in the sidewalls 2206 of the light-guide elements 2202, 2204. The gap 2208 between the light-guide elements 2202, 2204 may also create a gap in the distribution of emitted light 2210.

In various embodiments, through judicious placement and/or configuration of the light-guide elements, the amount of non-uniform light emitted at the borders of the light-guide elements may be reduced. In addition, a structure may be added to a planar illumination area that creates blurring and conceals the visibility of the borders between the light-guide elements.

In one embodiment, the walls of a light-guide element are modified to reduce the light emitted therefrom, and thereby reduce the non-uniform light emitted at the borders between light-guide elements. For example, the walls of the light-guide element may be covered in a material that absorbs or reflects light, but does not prevent the emission of intensified light from the end area. This diffuses at least part of the light hitting the sidewall of the light-guide element in many directions, and the light is emitted from the upper or lower surface of the light-guide. In another embodiment, the wall of the light-guide element is polished to a tolerance of approximately 20 nm root-mean-square or 150 nm peak-to-peak so that the light incident on the sidewall of the light-guide element may be reflected or refracted instead of diffused. In another embodiment, the wall of the light-guide element is polished to a tolerance less than approximately 600 nm peak-to-peak. If the light is refracted, it may pass through the propagating light-guide element and enter a neighboring light-guide element, where it may be emitted or again refracted. If the light is reflected, it may continue to propagate in the original light-guide element.

Figure 23:
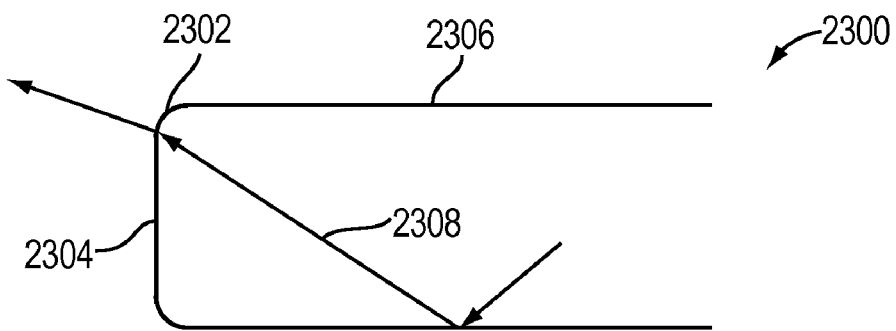
FIGS. 23 and 24 are elevational views of light-guide element sidewall structures in accordance with embodiments of the invention.

In another embodiment, the shape of a sidewall of a light-guide element may be modified to affect the emission of light. FIG. 23 shows a portion of a light-guide element 2300 wherein the junction 2302, where the sidewall 2304 of the light-guide element meets a surface 2306 of the light-guide element 2300, is curved. The curved area 2304 changes the angle of incidence of the light 2308 striking it, thereby permitting the light 2308 to be refracted out of the light-guide element 2300. In a related embodiment, light may also be emitted from a polished sidewall of a light-guide element if the light striking a portion of the sidewall strikes with an appropriate angle in relation to the critical incident angle.

Figure 24:
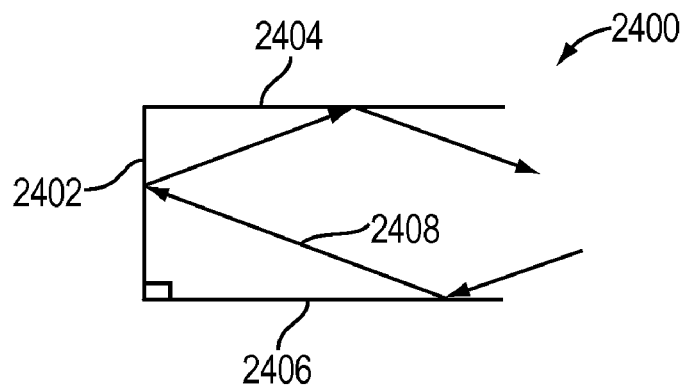

In another embodiment, as shown in FIG. 24, the sidewall 2402 of the light-guide element 2400 creates a right angle with respect to the upper and lower surfaces 2404, 2406 of the light-guide element 2400. The angle of the sidewall 2402 of the light-guide element 2400, alone or in combination with the polishing of the sidewall 2402, causes light 2408 reaching the sidewall 2402 to be reflected, rather than being emitted from the light-guide element 2400.

A diffusive sheet may be used to reduce non-uniform light emitted from the borders of a light-guide element. Light is thereby emitted at a wide angle from the surface of a light-guide element near the border and in a transverse direction compared to the direction of the border line. Coupling two light-guide elements that emit in this manner blurs the visibility of the border line with the help of a transparent diffusive sheet having a small diffusion value, such as, for example, 10-20% diffusive direction transmission and 80-70% reserve direction transmission.

Figure 25:
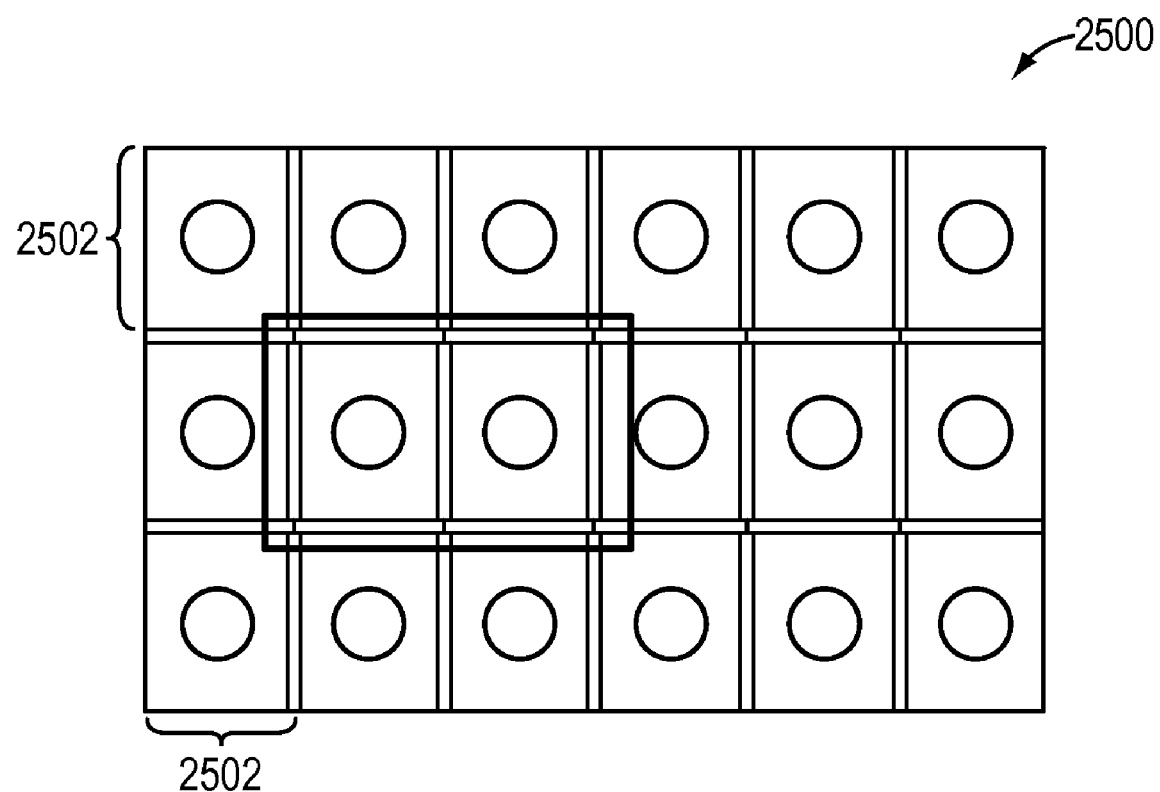
FIG. 25 is a plan view of a planar illumination area with a transparent diffusive sheet in accordance with embodiments of the invention.
Figure 26:
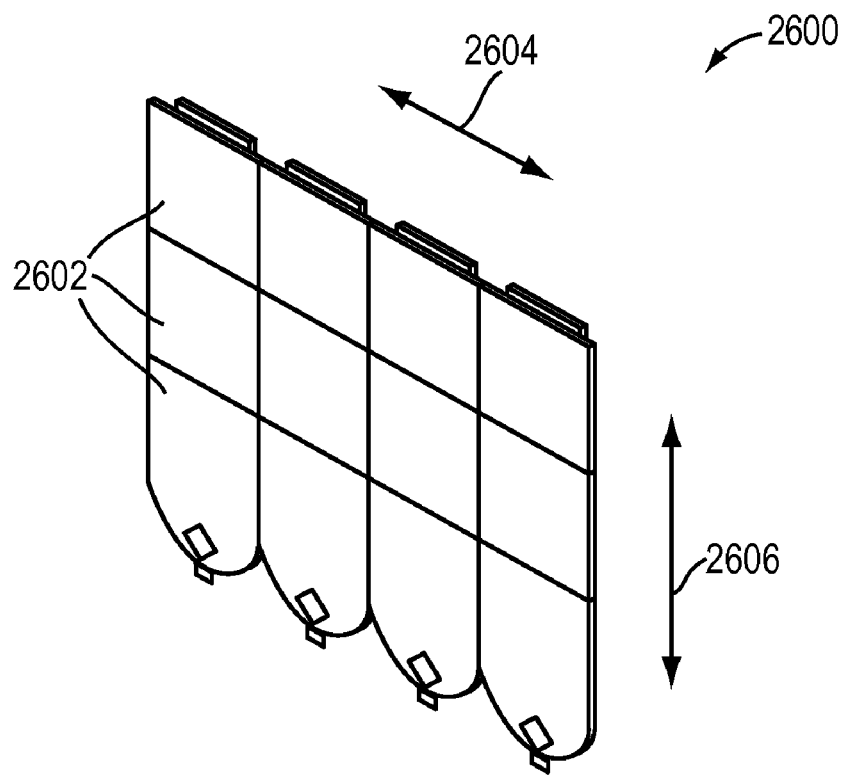
FIG. 26 is a perspective view of a back-light unit (BLU) application with tiled elements in accordance with an embodiment of the invention.

For example, as shown in FIG. 25, a planar illumination area 2500 may be covered by a transparent diffusive sheet. In this example, each light-guide element 2502 is sized 82 mm by 63 mm, and is separated from a neighboring light-guide element by 6 mm. The distance of the highest diffuser from the illuminated surface is 4.5 mm. The non-uniformity of the stitch at the center of the black rectangle of FIG. 26 may be simulated using the calculation:

$$\text{Non-Uniformity}[\%] = \pm \frac{\text{Max} - \text{Min}}{\text{Max} + \text{Min}},$$

which, when applied to the planar illumination area 2500, indicates that the non-uniformity in light emission without using a diffuser is ±22%, while the non-uniformity with a diffuser in place is ±7%.

Emission of light at a wide angle may enable blurring of the border lines between light-guide elements joined together along one axis and laid over one another along a perpendicular axis. Light may be emitted a wide angle in a direction perpendicular to the border line between light-guide elements, and at a narrow angle in a direction parallel to the border line, and a diffuser sheet may be placed over the light-guide elements. This structure increases the brightness of the illuminating surface, which may be useful for, for example, backlight unit (BLU) applications in which a brightness enhancement film ("BEF") sheet is used to reduce the angle of the emitted light and obtain greater brightness.

There may be a lack of symmetry in the range of the light emission angle in the two axes. For BLU applications, the lack of symmetry may be suitable for the emission of wide angle light to be in the direction of the horizontal axis and the narrow angle light in the direction of the vertical axis. In one embodiment, shown in FIG. 26, a BLU 2200 includes light-guide elements 2602 tiled next to one another in the direction of the horizontal axis 2604 and laid on top of one another in the direction of the vertical axis 2606. In another embodiment, the propagation direction of light in a light-guide element 2602 is continuous with respect to another aligned light-guide element, and mixing in the propagation direction of the light is thereby reduced.

Figure 27:
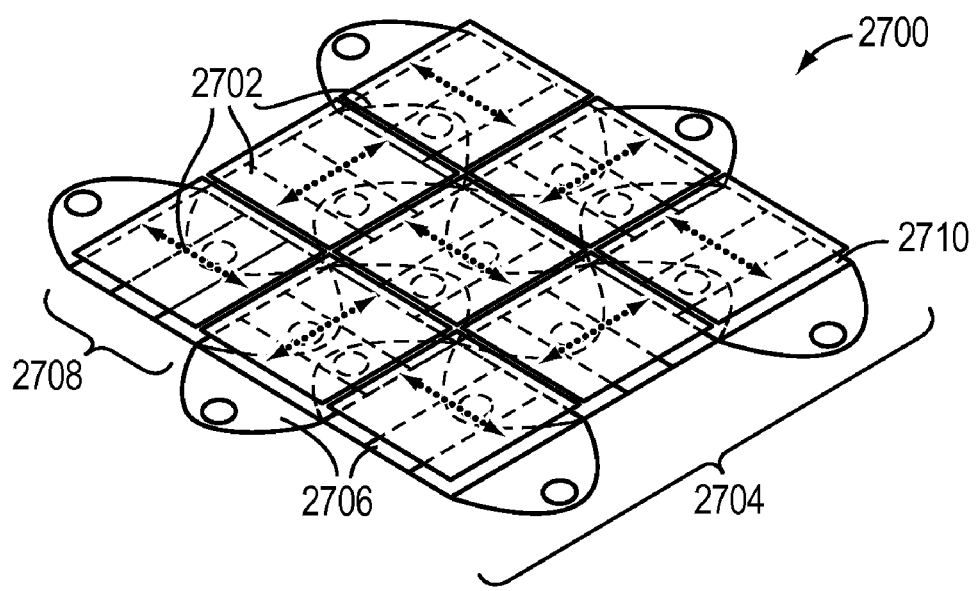
FIG. 27 is a perspective view of a planar illumination area covered by a light-absorbing surface in accordance with an embodiment of the invention.

In another embodiment, shown in FIG. 27, the mixing of the light directions may be balanced by a suitable arrangement of optical prism sheets 2702, such as BEF sheets, that are placed above a planar illumination area 2704 to form a composite structure 2700. The direction of the optical prism sheets 2702 is generally aligned in the propagation direction of the light in the light-guide elements 2706, and each optical prism sheet 2702 overlies the out-coupling region 2708 of a light-guide element 2706, separated by a gap 2710.

Figure 28:
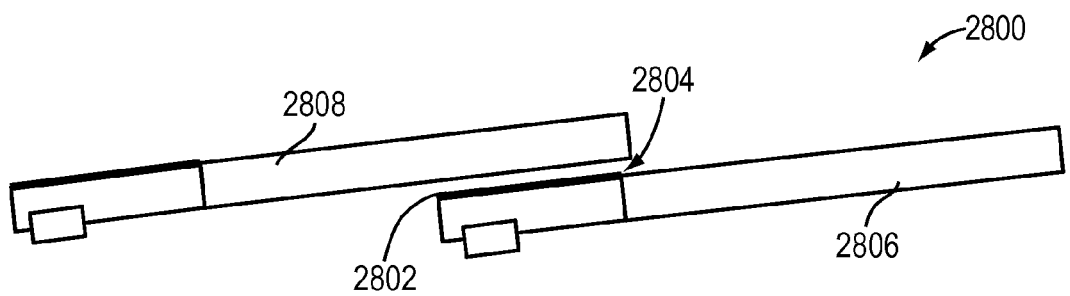
FIG. 28 depicts a cross-section of a planar illumination area with a light-absorbing surface placed in the regions where light-guide elements overlap in accordance with an embodiment of the invention.

With reference to the structure 2800 shown in FIG. 28, a light-absorbing surface 2802 may be placed in the region 2804 where two light-guide elements 2806, 2808 overlap to reduce the amount of light escaping between them, as explained with reference to FIG. 20. The light-absorbing surface 2802 may be a prism optical foil, such as a BEF sheet, that reduces the exit angles of this light, or, alternatively, bends the light back into the light-guide elements 2806, 2808 by allowing it to be coupled and spread inside. The light may thus be recycled so that it joins the light spreading in the light-guide elements 2806, 2808. When the stray light is at an obtuse angle relative to the perpendicular direction of the light-guide elements 2806, 2808, more of the light may be recovered by the light-absorbing element 2802.

Figure 29:
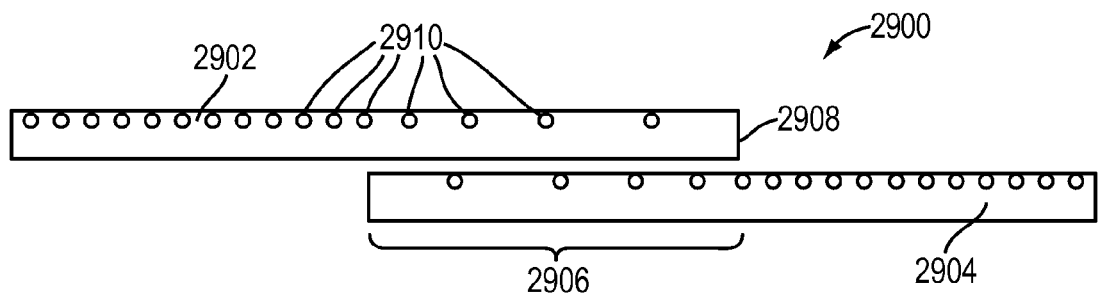
FIG. 29 depicts a cross-section of two light-guide elements with transition regions in accordance with an embodiment of the invention.
Figure 30:
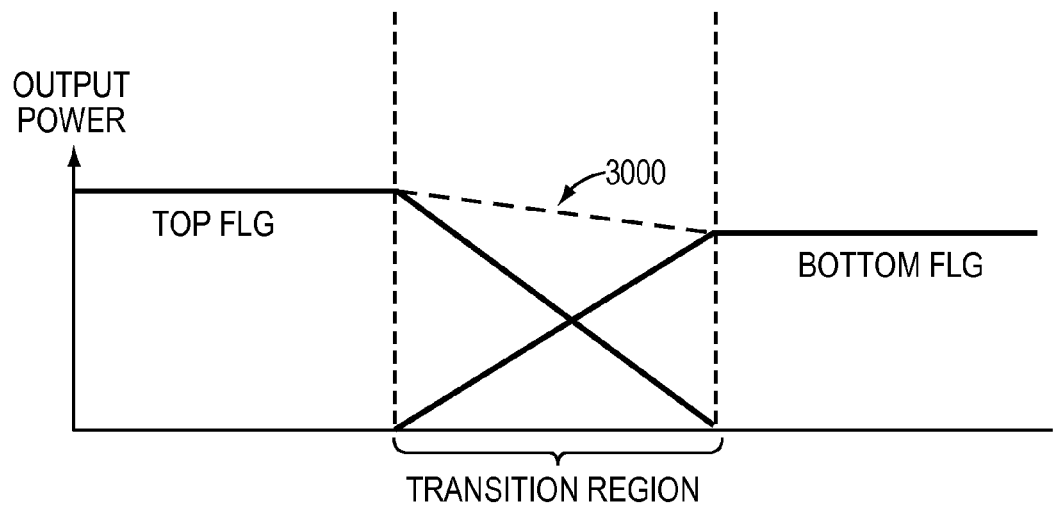
FIG. 30 graphically depicts the power output of each element shown in FIG. 29.

Adjacent light-guide elements may be overlapped to reduce a sharp contrast between the illumination of the light-guide elements. FIG. 29 shows a structure 2900 in which a first light-guide element 2902 is laid on top of an adjacent light-guide element 2904. The area of light emission of the upper light-guide element 2902 covers not only the in-coupling, concentration, and propagation regions of the lower light-guide element 2904, but also a portion of its out-coupling region. This configuration allows the creation of a transition or overlap region 2906 between the light-guide elements 2902, 2904. In one embodiment, an edge 2908 of the upper light-guide element 2902 forms a non-straight line. Light is transmitted from the out-coupling area of the lower light-guide element 2904 through the upper light-guide element 2902 to create a gradual change in the strength of the light across the transition area 2906 between the light-guide elements 2902, 2904. This gradual change may be created by gradually decreasing the density of light-scattering elements (e.g., particles as described above) 2910 within each of the light-guide elements 2902, 2904 in the transition region 2906. FIG. 30 illustrates how the output power of each of the light-guide elements 2902, 2904 gradually decreases within the transition zone 2906. The sum 3000 of the output power of both light-guide elements 2902, 2904, however, should be approximately constant (i.e., uniform) across the area of the transition zone 2906. In one embodiment, the output power between the transition region 2906 and the non-overlapping out-coupling regions of the light-guide elements 2902, 2904 is substantially uniform, i.e., differs by no more than 10%.

Figure 31:
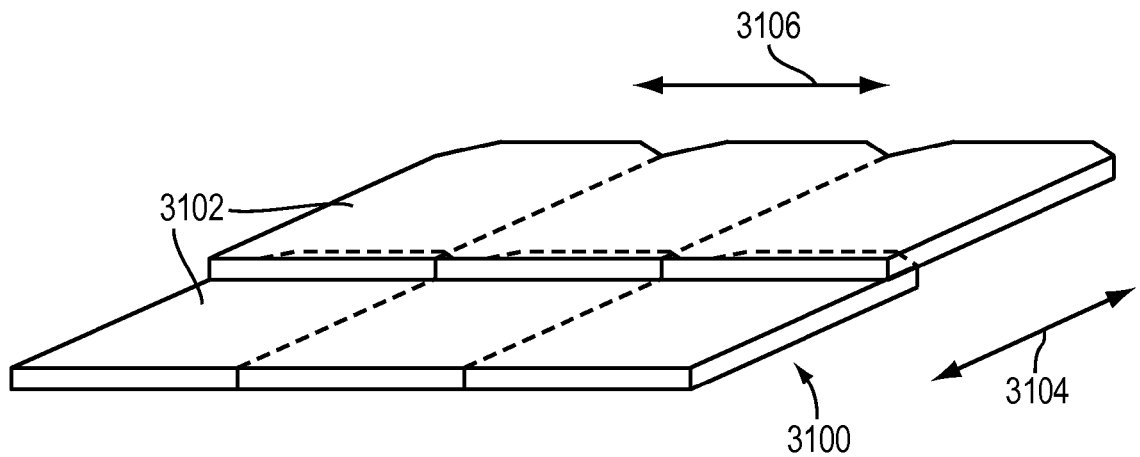
FIGS. 31-36 depict different methods and systems for overlapping light-guide elements to form planar illumination areas with transition regions, and the light-guide elements used therein, in accordance with embodiments of the invention.
Figure 32A:
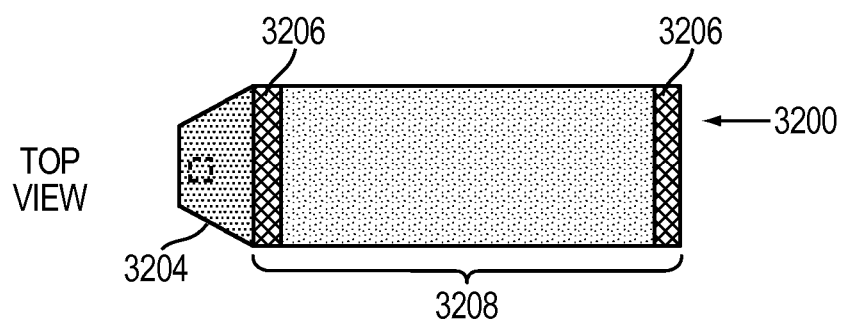
Figure 32B:
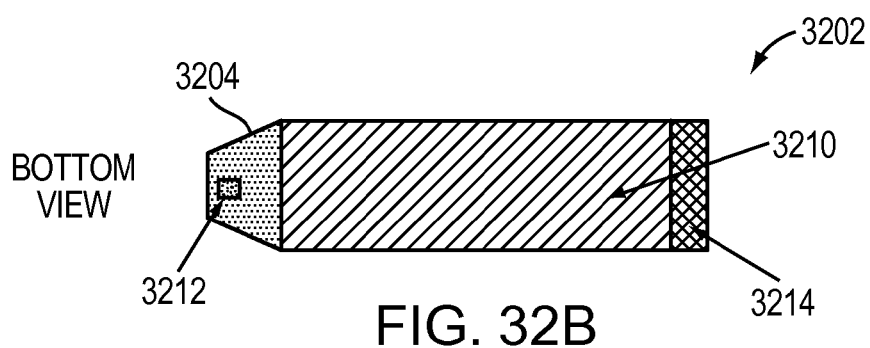
Figure 33:
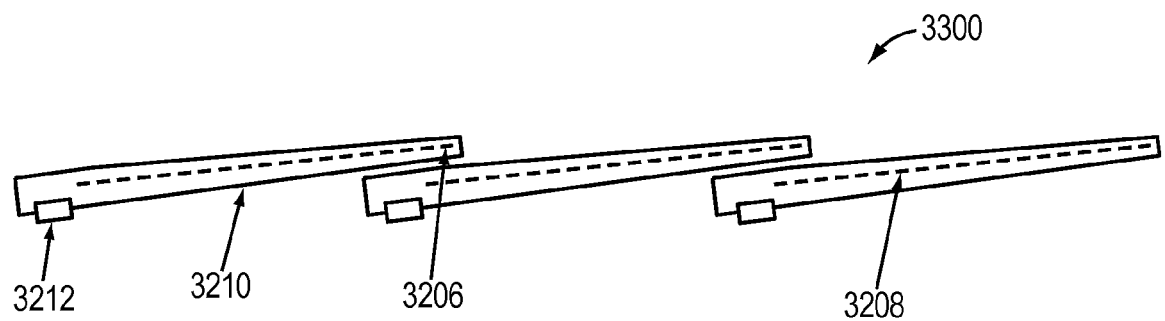

Another planar illumination area 3100 made from overlapping light-guide elements 3102 is shown in FIG. 31. In this embodiment, the light-guide elements 3102 are tiled in a graded manner in one direction 3104 and placed tightly together in the other direction 3106. FIGS. 32A and 32B show a top and bottom views 3200, 3202, respectively, of a light-guide element 3204 that may be used in the structure 3100, and FIG. 33 shows a side view 3300. Transition regions 3206 exist on both sides of an out-coupling region 3208. Each light-guide element 3204 also features a bottom reflector 3210, a light source 3212, and a transparent region 3214. In this configuration, where the out-coupling region of an element underlies the out-coupling region of another element, it is transparent so as not to augment the light emitted from the overlying out-coupling region.

Figure 34:
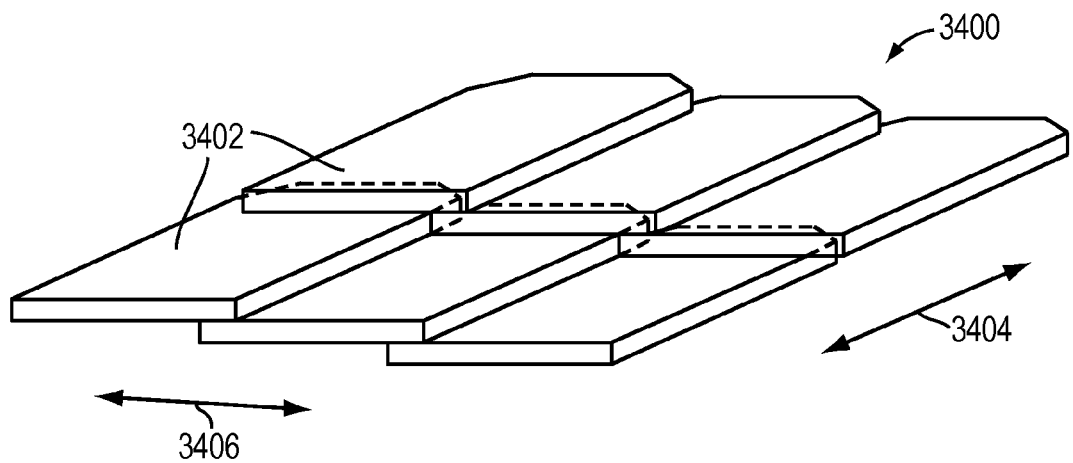
Figure 35:
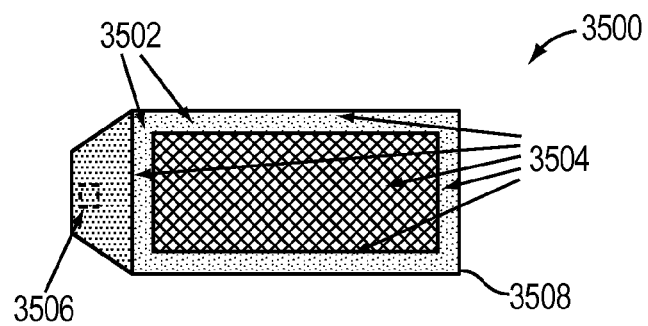
Figure 36:
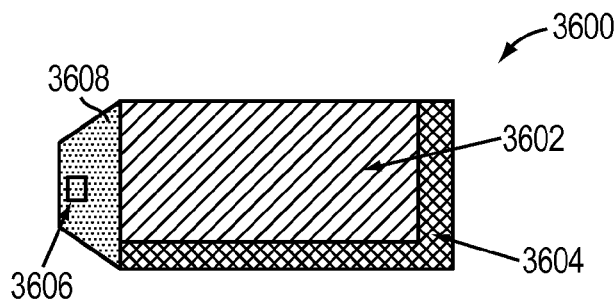

In another embodiment, shown in FIG. 34, a planar illumination area 3400 may be constructed by overlapping a series of light-guide elements 3402 in two directions 3404, 3406. With reference to FIGS. 35 and 36, a transition region 3502 surrounds the out-coupling region 3504 on all four sides thereof, as shown by the top view 3500 and bottom view 3600 of a light-guide element 3508, allowing four other tiles to overlap, or be overlapped by, all four sides of the transition region 3502. An out-coupling region 3504, light source 3506, bottom reflector 3602, and transparent region 3604 are also shown. The transition region 3502 may be transparent on two or four sides, for example, depending on the characteristics of the transition regions of adjacent tiles; the objective, once again, is to retain a constant light output across the overlapping regions.

Figure 37:
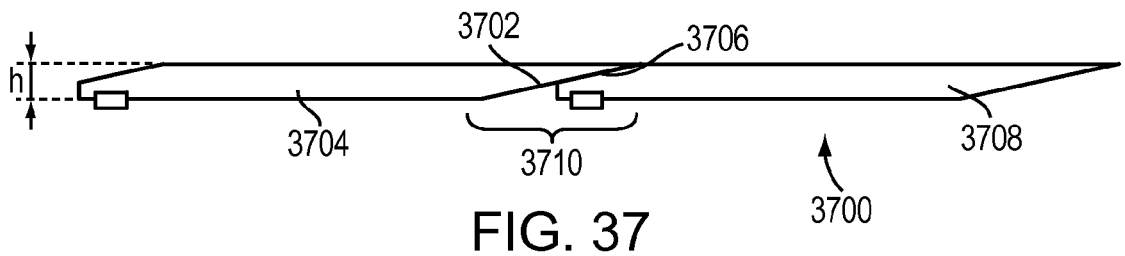
FIGS. 37 and 38 depict cross-sections of planar illumination areas made with light-guide elements having non-vertical sidewalls in their overlapping regions in accordance with embodiments of the invention.
Figure 38:
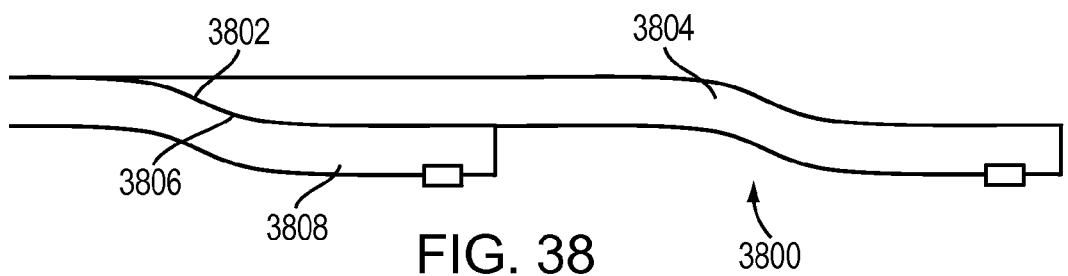

A sidewall of a first light-guide element may be formed such that overlapping the first light-guide element with a second does not cause a lack of uniformity in the height of the formed planar illumination area. For example, as shown with respect to the planar illumination area 3700 in FIG. 37, a first sidewall 3702 of a first light-guide element 3704 may be non-vertical, and a second sidewall 3706 of an adjacent, second light-guide element 3708 may be non-vertical and complementary to the first sidewall 3706. The two light-guide elements 3704, 3708 overlap in a region 3710 that includes the non-vertical sidewalls 3702, 3706 without a variation in the height h of the planar illumination area 3700. In the alternative embodiment 3800 shown in FIG. 38, a sidewall 3802 of a first light-guide element 3804 may be curved to fit into the curvature 3806 of an adjacent, second light-guide element 3808.

Figure 39A:
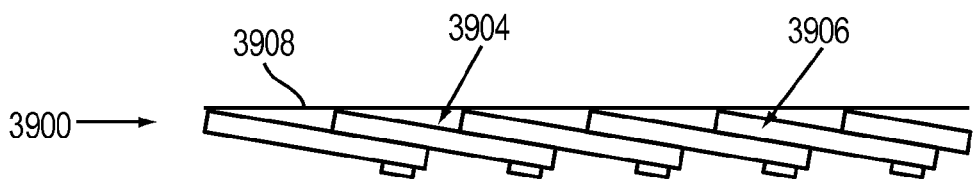
FIG. 39A is an elevation of one embodiment of a planar illumination area including a transparent filling material in accordance with an embodiment of the invention.
Figure 39B:
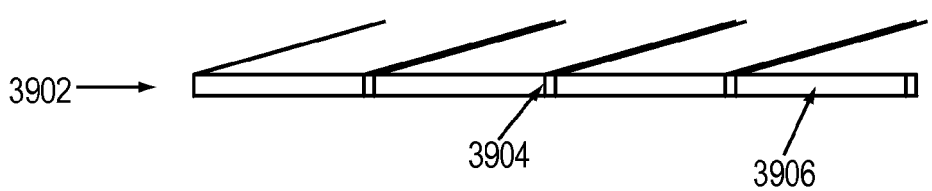
FIG. 39B is a perspective view of another embodiment of a planar illumination area including a transparent filling material in accordance with an embodiment of the invention.

FIGS. 39A-B illustrate, in alternative embodiments, side views of two planar illumination areas 3900, 3902 that include a transparent filling material 3904. The planar illumination area 3900 uses the transparent filling material 3904 to reduce irregularities in the height of the area 3900 produced by overlapping light-guide elements 3906. The refractive index of the transparent filling material 3904 preferably matches the refractive index of the light-guide elements 3906. In addition, use of the transparent filling material 3904 creates a flat and smooth illumination surface 3908. In an alternative embodiment, the planar illumination area 3902 includes transparent filling material 3904 in the space between the light-guide elements 3906, and this transparent filling material 3904 preferably has a refractive index that matches the refractive index of the light-guide elements 3906.

Utilization of a tile structure with a polished wall, as described above, in connection with the planar illumination area 3902 may help create continuity between each light-guide element and its neighbor, allowing the light to spread between neighboring tiles. The merging of the light between the neighboring tiles desirably creates continuous and monotonic change in the intensity of the light between the two sides of the stitch line without the need for an overlapping structure as described above.

5. Led Sub-Assembly

Figure 40:
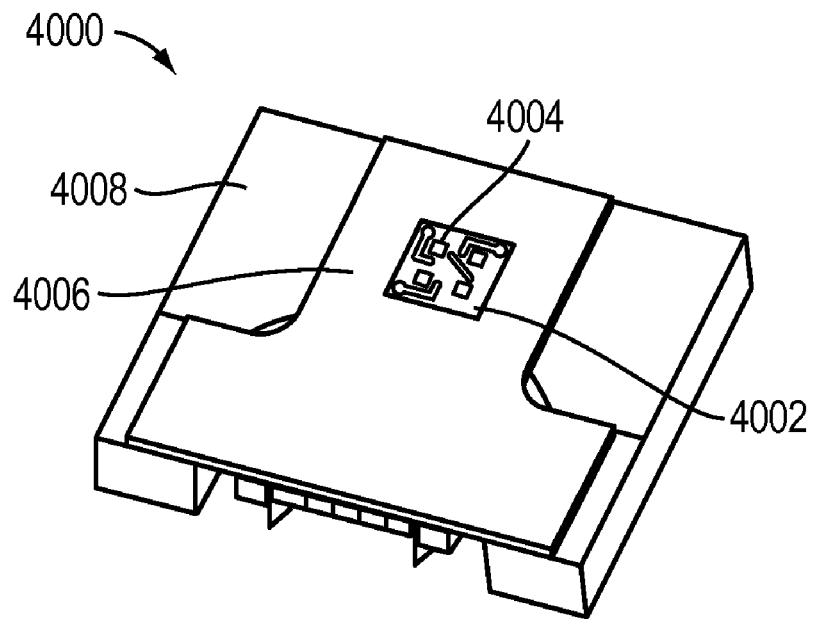
FIG. 40 depicts an LED sub-assembly in accordance with an embodiment of the invention.

In various embodiments of the present invention, an LED sub-assembly is attached to a light-guide element. The LED sub-assembly functions as a platform for at least one light source and provides electrical and mechanical connectivity to the light-guide element. FIG. 40 illustrates an exemplary embodiment of an LED sub-assembly 4000, including a carrier platform 4002, LED bare-die chips 4004, a printed circuit board ("PCB") 4006, and an interface plate 4008. These components are shown in greater detail in FIGS. 41-44. In other embodiments, the LED bare-die chips 4004 may be replaced with packaged LED, RGB, or white light sources. The light sources may be either side-emitting or top-emitting (i.e., Lambertian) sources.

Figure 41:
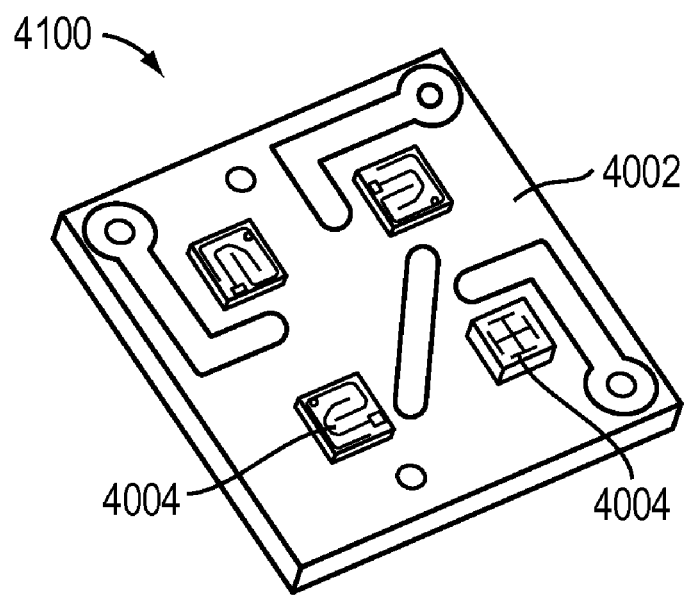
FIGS. 41-43 depict a carrier platform and bare-die LEDs, a printed circuit board, and an interface plate in accordance with embodiments of the invention.

FIG. 41 illustrates a structure 4100 including a carrier platform 4002 suitable for supporting one or more light sources. The light sources may be, for example, bare-die LED chips 4004. The carrier platform 4002 may be any platform used for the assembly of LEDs, and, in one embodiment, exhibits good thermal conductivity. The carrier platform 4002 may mechanically support the LED bare-die chips 4004, enable heat dissipation from the LED bare-die chips 4004 by thermal conduction, and provide electrical connectivity to the LED bare-die chips 4004.

Figure 42A:
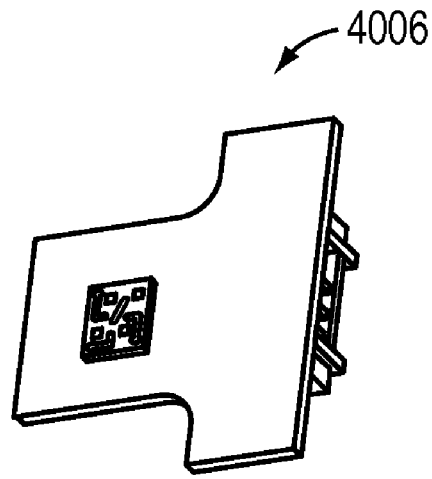
Figure 42B:
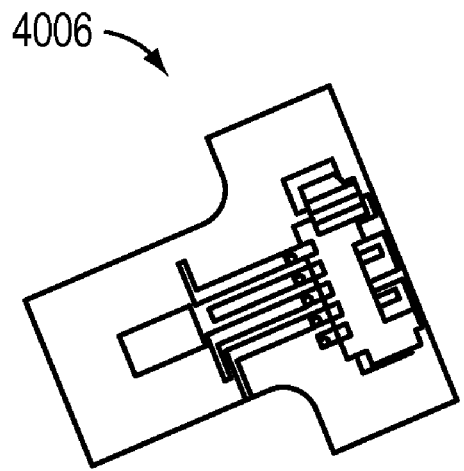

FIGS. 42A and 42B illustrate, in one embodiment, top and bottom views, respectively, of the printed circuit board 4006. The carrier platform 4002 with the LED bare-die chips 4004 may be mounted on the printed circuit board 4006 via a connector. The printed circuit board 4006 includes a contour electrical interface to supply electrical current to the light sources. The printed circuit board 4006 also mechanically supports the carrier platform 4002 and is in thermal contact therewith, thus enhancing heat dissipation from the light sources.

Figure 43:
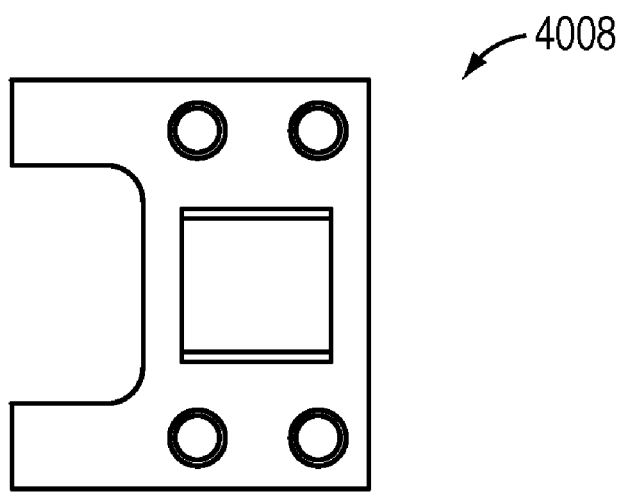

FIG. 43 illustrates one embodiment of the interface plate 4008, which provides mechanical connectivity and support to an illumination source. The interface plate mechanically connects the entire LED sub-assembly 4000 to a light-guide element. Further, it may enable mechanical connection of a planar illumination source to the required application structure. It may also assist thermal dissipation by providing thermal connectivity between the planar illumination source and the application structure.

Figure 44:
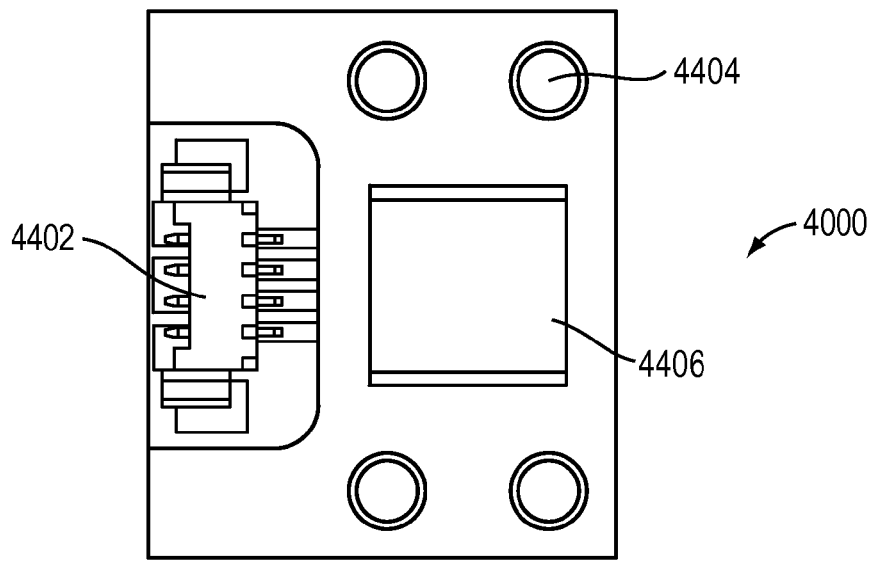
FIG. 44 depicts a bottom view of the LED sub-assembly.
Figure 45:
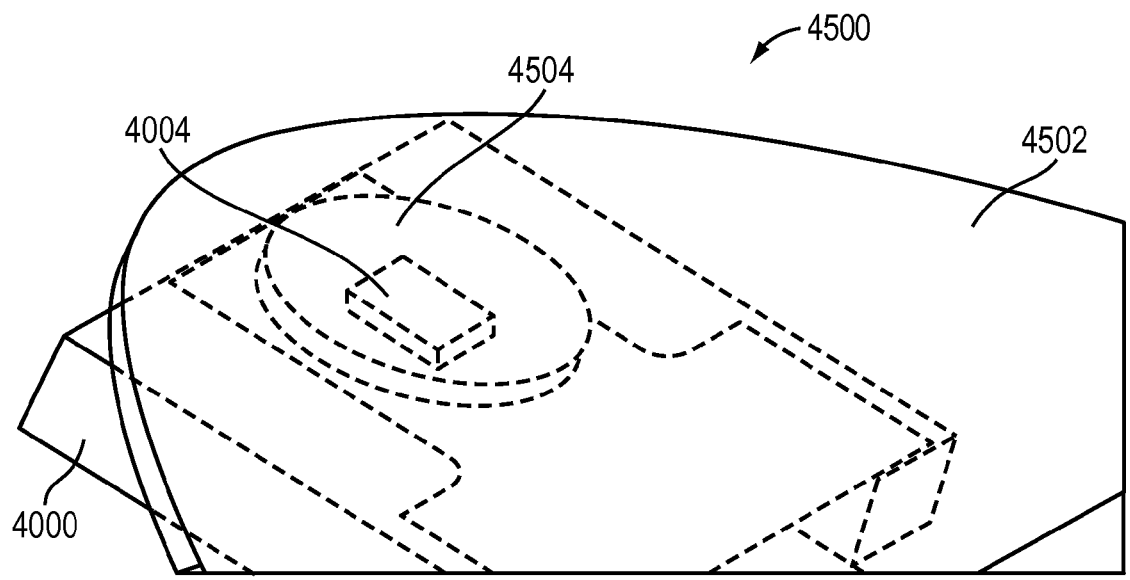
FIG. 45 is a perspective view of a planar illumination unit in accordance with embodiments of the invention.

FIG. 44 illustrates a bottom view of the LED sub-assembly 4000, in which an electrical interface 4402, mechanical interface 4404, and heat conduction interface 4406 are visible. FIG. 45 shows the LED sub-assembly 4000 assembled together with a light-guide element 4502 to form a planar illumination source 4500. The LED bare-die chip 4004, mounted on the carrier platform 4002, may be placed in a suitable socket formed by the joining of the LED sub-assembly 4000 and the in-coupling region 4504 of the light-guide element 4502. The light emitted from a LED bare-die chip 4004 is coupled to the in-coupling region 4504 of the light-guide element 4502.

In one embodiment, the LED bare-die chip 4004 is placed in the LED sub-assembly 4000, which is then attached to the light-guide element 4502 following other assembly steps that require high temperatures (e.g., higher than approximately 85° C.) that may damage the polymers in the light-guide element. Any gaps between the in-coupling region 4504 of the light-guide element 4502 and the carrier platform 4002 may be filled with a suitable filler material. The filler material can tolerate the operating temperatures of the LED (e.g., lower than approximately 150° C., or even lower than approximately 70° C.), but may not be capable of tolerating the higher temperatures required for assembly (e.g., soldering, at approximately 250° C.) of the LED sub-assembly 4000. The filler material generally fills the LED socket and covers the surface of the LED die and any wire bonds connected thereto. Examples of suitable filler materials include UV-curable adhesives such as LIGHT WELD 9620, available from Dymax Corporation of Torrington, Conn., and encapsulation gels such as LS-3249 and LS-3252, available from NuSil Technology LLC of Wareham, Mass.

The LED bare-die chip 4004 may be coupled directly into the light-guide element 4502 using an intermediary material with suitable optical and mechanical characteristics. This intermediary material may be all or a portion of an encapsulation structure disposed over the LED bare-die chip 4004. The form of the encapsulation is dictated by the shape and refractive-index requirements of the optical interface with the light-guide element 4502. If an encapsulation element is used, the space between the walls of the socket in the light-guide element 4502 and the external surface of the encapsulation structure may be filled with optical glue with suitable optical and mechanical characteristics.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A planar illumination area comprising:
a first discrete light-guide element comprising (i) a first light source emitting light therein, (ii) first and second adjacent non-parallel sidewalls spanning top and bottom surfaces, and (iii) a first out-coupling region in the top surface; and
a second discrete light-guide element in contact with the first discrete light-guide element and comprising (i) a second light source, different from the first light source, emitting light therein, (ii) first and second adjacent non-parallel sidewalls spanning top and bottom surfaces, and (iii) a second out-coupling region in the top surface, only a portion of the second out-coupling region, including at least one sidewall of the second light-guide element, being disposed over and overlapping only a portion of the first out-coupling region including at least one sidewall of the first light-guide element, to define an overlapping region having an area,
wherein (i) a light output power of the first out-coupling region within the overlapping region is less than a light output power of the first out-coupling region outside the overlapping region and (ii) a light output power of the second out-coupling region within the overlapping region is less than a light output power of the second out-coupling region outside the overlapping region, whereby the overlapping region emits a substantially uniform light output power over the area.

2. The planar illumination area of claim 1, wherein the light output power of the overlapping region differs from the light output power of the first and second out-coupling regions outside the overlapping region by no more than 10%.

3. The planar illumination area of claim 2, wherein the change in light output power between the overlapping region and the first and second out-coupling regions outside the overlapping region is gradual.

4. The planar illumination area of claim 1, wherein the first out-coupling region comprises light-scattering elements therein, a density of the light-scattering elements disposed within the first out-coupling region outside the overlapping region being greater than a density of the light-scattering elements disposed within the first out-coupling region inside the overlapping region.

5. The planar illumination area of claim 4, wherein the density of the light-scattering elements inside the overlapping region decreases along one direction.

6. The planar illumination area of claim 1, wherein the second out-coupling region is transparent in the overlapping region so as not to augment light emitted from the first out-coupling region.

7. The planar illumination area of claim 6, wherein, in the overlapping region, light emitted from the first out-coupling region passes through the second out-coupling region.

8. The planar illumination area of claim 1, further comprising a third discrete light-guide element comprising a third out-coupling region in its top surface, only a portion of the third out-coupling region overlapping only a second portion of the second out-coupling region to define a second overlapping region different from the overlapping region and having a second area, wherein the second overlapping region emits a substantially uniform light output power over the second area.

9. The planar illumination area of claim 1, wherein at least a portion of the first sidewall of the first light-guide element (i) is non-vertical and (ii) forms a non-right angle with at least one of the top or bottom surfaces of the first light-guide element, and at least a portion of the first sidewall of the second light-guide element (i) is non-vertical, (ii) forms a non-right angle with at least one of the top or bottom surfaces of the second light-guide element, and (iii) is complementary to the first sidewall of the first light-guide element, the first sidewalls of the first and second light-guide element being disposed beneath a top surface of the second light-guide element in the overlapping region.

10. The planar illumination area of claim 9, wherein a top surface of the planar illumination area comprises the top surfaces of the first and second light-guide elements and is substantially flat.

11. The planar illumination area of claim 1, further comprising additional discrete light-guide elements forming, with the first and second light-guide elements, an array extending in first and second non-parallel directions, wherein the light-guide elements overlap in the first direction and do not overlap in the second direction.

12. The planar illumination area of claim 1, further comprising additional discrete light-guide elements forming, with the first and second light-guide elements, an array extending in first and second non-parallel directions, wherein the light-guide elements overlap in the first and second directions.

13. The planar illumination area of claim 1, wherein the overlapping region comprises a light-absorbing material.

14. The planar illumination area of claim 1, wherein at least a portion of a sidewall of the first light-guide element comprises a reflective coating.

15. The planar illumination area of claim 1, wherein at least a portion of a sidewall of the second light-guide element comprises a reflective coating.

16. The planar illumination area of claim 1, wherein only a portion of a top surface of at least one of the first light-guide element or the second light-guide element is a light-absorbing surface.

17. A method of forming a planar illumination area, the method comprising:
providing a first discrete light-guide element comprising (i) a first light source emitting light therein, (ii) first and second non-parallel sidewalls spanning top and bottom surfaces, and (iii) a first out-coupling region in the top surface; and
disposing beneath and overlapping only a portion of the first light-guide element with a second discrete light-guide element comprising (i) a second light source, different from the first light source, emitting light therein, (ii) first and second non-parallel sidewalls spanning top and bottom surfaces, and (iii) a second out-coupling region in the top surface, thereby forming an overlapping region comprising only a portion of the first out-coupling region including at least one sidewall of the first light-guide element and only a portion of the second out-coupling region including at least one sidewall of the second light-guide element,
wherein (i) a light output power of the first out-coupling region within the overlapping region is less than a light output power of the first out-coupling region outside the overlapping region and (ii) a light output power of the second out-coupling region within the overlapping region is less than a light output power of the second out-coupling region outside the overlapping region, whereby the overlapping region emits a substantially uniform light output power.

18. A planar illumination area comprising:
a first discrete light-guide element comprising a polished sidewall disposed between a top surface and a bottom surface of the first light-guide element; and
a second discrete light-guide element comprising a polished sidewall disposed between a top surface and a bottom surface of the second light-guide element, the polished sidewall of the second light-guide element being adjacent to the polished sidewall of the first light-guide element,
wherein the second light-guide element receives light from the first light-guide element through the polished sidewalls, and light is refracted as it travels from the first light-guide element to the second light-guide element.

19. The planar illumination area of claim 18, further comprising an index-matching material located between the sidewalls, an index of refraction of the index-matching material being approximately equal to an index of refraction of at least one of the first light-guide element or the second light-guide element.

20. The planar illumination area of claim 18, wherein the first and second polished sidewalls are polished to a tolerance less than approximately 600 nm peak-to-peak.

21. A planar illumination area comprising:
a first discrete light-guide element comprising a sidewall disposed between a light-emitting top surface and a bottom surface of the first light-guide element;
a second discrete light-guide element comprising a sidewall disposed between a light-emitting top surface and a bottom surface of the second light-guide element, the first and second light-guide elements being butted together or only partially overlapping such that their light-emitting top surfaces collectively form a single continuous illumination surface including at least one of the sidewalls; and
an index-matching material covering the sidewalls, an index of refraction of the index-matching material being approximately equal to an index of refraction of at least one of the first light-guide element or the second light-guide element,
wherein light travels between the first and second light-guide elements, and, in a direction of travel from the first light-guide element to the second light-guide element, an intensity of light emitted by the continuous illumination surface changes continuously and monotonically notwithstanding the included sidewalls.

22. The planar illumination area of claim 21, wherein the sidewall of the second light-guide element is adjacent to the sidewall of the first light-guide element and the index-matching material is located between the sidewalls.

23. The planar illumination of claim 21, wherein the first and second light-guide elements only partially overlap, and the index-matching material is disposed over and in direct contact with the first and second light-guide elements to create a smooth surface thereover.

* * * * *

UNITED STATES PATENT AND TRADEMARK OFFICE
CERTIFICATE OF CORRECTION

PATENT NO. : 7,907,804 B2  Page 1 of 1
APPLICATION NO. : 12/324555
DATED : March 15, 2011
INVENTOR(S) : Noam Meir et al.

It is certified that error appears in the above-identified patent and that said Letters Patent is hereby corrected as shown below:

On the Title Page:

Item (60), "Related U.S. Application Data," should read

--Provisional application No. 61/006,110, filed on Dec. 19, 2007
  Provisional application No. 61/064,384, filed on Mar. 3, 2008
  Provisional application No. 61/127,095, filed on May 9, 2008
  Provisional application No. 61/059,932, filed on Jun. 9, 2008--.

Signed and Sealed this
Thirty-first Day of May, 2011

David J. Kappos
*Director of the United States Patent and Trademark Office*